INVENTORS
STAMATES I. FRANN
PATRICK J. MCKEOWN
BY Borst & Borst
ATTORNEYS

AUTOCORRECTOR FOR DEAD RECKONING NAVIGATION COMPUTER

Filed April 25, 1961 25 Sheets-Sheet 2

INVENTORS
STAMATES I. FRANN
PATRICK J. McKEOWN
BY Boret & Boret
ATTORNEYS

INVENTORS
STAMATES I. FRANN
PATRICK J. McKEOWN
BY Brost & Brost
ATTORNEYS

AUTOCORRECTOR FOR DEAD RECKONING NAVIGATION COMPUTER

Filed April 25, 1961

INVENTORS
STAMATES I. FRANN
PATRICK J. McKEOWN
BY Brost & Brost
ATTORNEYS

AUTOCORRECTOR FOR DEAD RECKONING NAVIGATION COMPUTER

Filed April 25, 1961 25 Sheets-Sheet 5

INVENTORS
STAMATES I. FRANN
PATRICK J. McKEOWN
BY Brown & Brown
ATTORNEYS

AUTOCORRECTOR FOR DEAD RECKONING NAVIGATION COMPUTER

Filed April 25, 1961 25 Sheets-Sheet 6

INVENTORS
STAMATES I. FRANN
PATRICK J. McKEOWN
BY Borst & Borst
ATTORNEYS

AUTOCORRECTOR FOR DEAD RECKONING NAVIGATION COMPUTER

Filed April 25, 1961

July 20, 1965 S. I. FRANN ETAL 3,196,264

AUTOCORRECTOR FOR DEAD RECKONING NAVIGATION COMPUTER

Filed April 25, 1961 25 Sheets-Sheet 8

INVENTORS
STAMATES I. FRANN
PATRICK J. McKEOWN
BY Borst & Borst
ATTORNEYS

AUTOCORRECTOR FOR DEAD RECKONING NAVIGATION COMPUTER

Filed April 25, 1961 25 Sheets-Sheet 9

TIME POTENTIOMETER RESET
PROGRAMMER STEPS V VI VII VIII.

Lo POSITION ERROR POTENTIOMETER RESET
PROGRAMMER STEP IX

INVENTORS
STAMATES I. FRANN
PATRICK J. McKEOWN
BY Borst & Borst
ATTORNEYS

AUTOCORRECTOR FOR DEAD RECKONING NAVIGATION COMPUTER

Filed April 25, 1961 25 Sheets-Sheet 10

INVENTORS
STAMATES I. FRANN
PATRICK J. McKEOWN
BY Borst & Borst
ATTORNEYS

AUTOCORRECTOR FOR DEAD RECKONING NAVIGATION COMPUTER

Filed April 25, 1961 25 Sheets-Sheet 12

AUTOCORRECTOR FOR DEAD RECKONING NAVIGATION COMPUTER

AUTOCORRECTOR FOR DEAD RECKONING NAVIGATION COMPUTER

Filed April 25, 1961

AUTOCORRECTOR FOR DEAD RECKONING NAVIGATION COMPUTER

INVENTORS
STAMATES I. FRANN
PATRICK J. McKEOWN
BY
ATTORNEYS

AUTOCORRECTOR FOR DEAD RECKONING NAVIGATION COMPUTER

Filed April 25, 1961 25 Sheets-Sheet 18

AUTOCORRECTOR FOR DEAD RECKONING NAVIGATION COMPUTER

AUTOCORRECTOR FOR DEAD RECKONING NAVIGATION COMPUTER

Filed April 25, 1961

INVENTORS
STAMATES I. FRANN
PATRICK J. McKEOWN
BY Borst & Borst
ATTORNEYS

INVENTORS
STAMATES I. FRANN
PATRICK J. McKEOWN
BY Borst & Borst
ATTORNEYS

INVENTORS
STAMATES I. FRANN
PATRICK J. McKEOWN
BY Brook & Brook
ATTORNEYS 3,196,264
AUTOCORRECTOR FOR DEAD RECKONING NAVIGATION COMPUTER

Stamates I. Frann, Whitestone, and Patrick J. McKeown, Syosset, N.Y., assignors to Sperry Rand Corporation, Ford Instrument Company Division, Wilmington, Del., a corporation of Delaware Filed Apr. 25, 1961, Ser. No. 105,346
24 Claims. (Cl. 235—187)

This invention relates to navigational systems and particularly to improved automatic correction equipment for dead reckoning computers and to auxiliary equipment for providing corrected values for the input information required by dead reckoning computers.

It is an object of the invention to provide improved automatic correction equipment for a dead reckoning computer which periodically, or on irregular occasions, corrects continuous dead reckoned vehicle positions as correct position information is received.

Another object is to provide such automatic correction equipment which will also compute a corrected heading and corrected velocity for the wind acting upon the vehicle.

Still another object is to provide improved automatic correction equipment which sequentially utilizes its basic components in various and different roles for a number of separate circuit functions.

In accordance with the invention there is provided an autocorrector for dead reckoning equipment which comprises means for indicating present vehicle position and means coupling the indicating means to the dead reckoning equipment, a source of correct vehicle information and additional means for decoupling the indicating means from the dead reckoning equipment and coupling them to the source when the latter provides a correct vehicle position.

In one embodiment of the invention, vehicle positions derived from a dead reckoning computer are displayed as a continuous displacement of one shaft to indicate estimated present vehicle latitude and as a continuous displacement of a second shaft to indicate the estimated present vehicle longitude in dependence upon predetermined wind direction and velocity information inserted as input data to the dead reckoning equipment. Periodically, or intermittently, as correct vehicle position information is received from ancillary equipment, the output shafts are abruptly advanced or set back to indicate the correct present vehicle latitude and longitude positions, respectively. The discrepancy in the positions of each output shaft is attributed to the error in the predetermined computer input data for wind heading and velocity acting on the vehicle during the time intervals between correct vehicle position information or "fixes." Accordingly, the true wind heading and velocity is determined by storing the movements of the latitude and longitude shafts and dividing the errors derived therefrom by the time interval between fixes. As a consequence, there is produced a wind correction for the predetermined wind input information for the dead reckoning computer. After proper vectorial additions the true heading and velocity of the wind acting on the vehicle is provided and displayed.

Other objects and features of the present invention will be set forth in the following description and claims and illustrated in the accompanying drawings which disclose, by way of example and not by way of limitation, the principle of the invention and an implementation of the inventive concept.

In the drawings, in which like reference numbers designate like components in the various diagrams:

Figure 3:
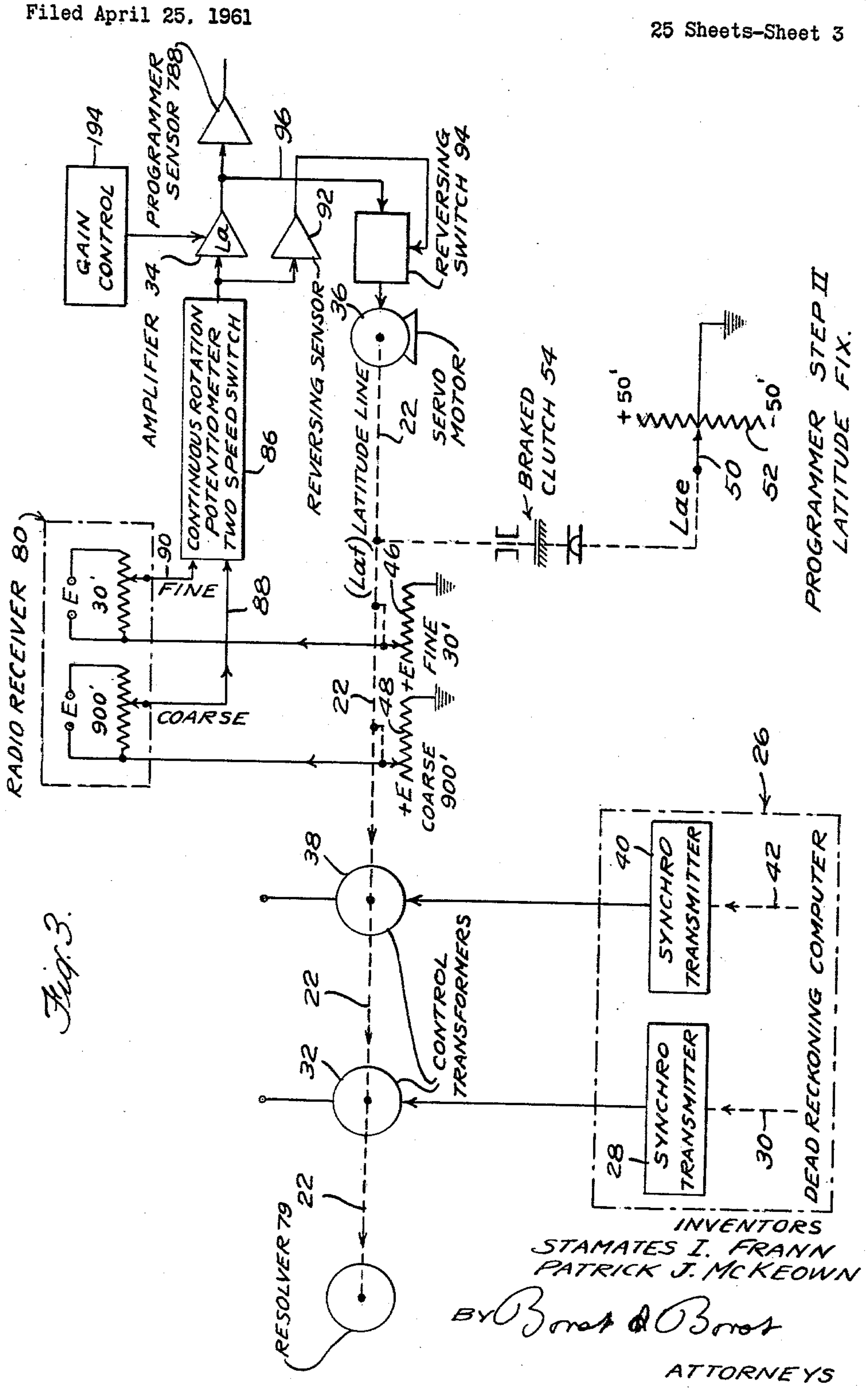
FIG. 3 is a schematic diagram of the system operating to correct the present latitude vehicle position of FIG. 1 upon receipt of correct latitude vehicle positions or "fixes;"
Figure 16:
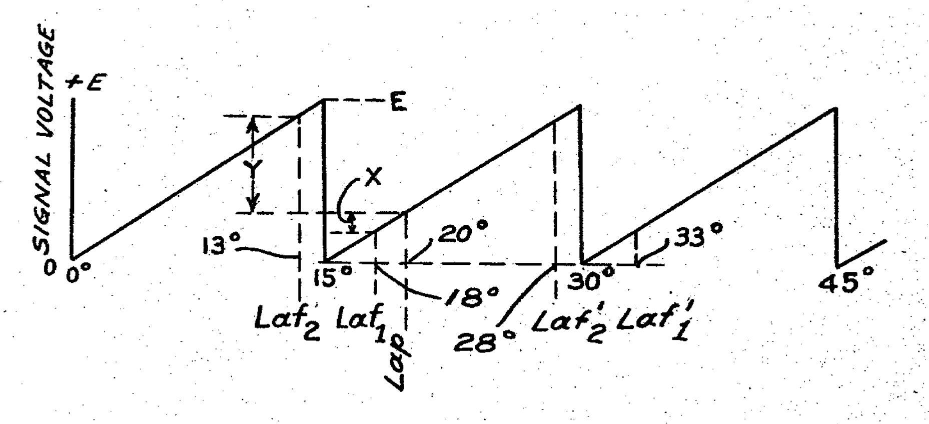
Figure 17:
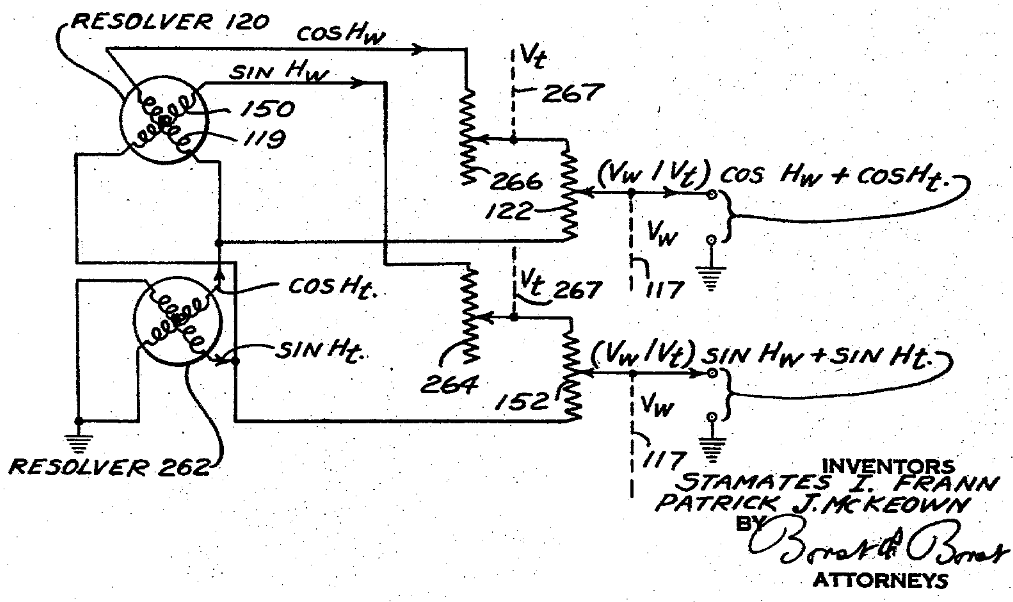

FIGS. 14*a* to 14*i*, taken together, show an overall system diagram, partly in schematic and partly in block representation, operative to selectively provide the circuits of FIGS. 1 to 13;

FIGS. 15*a* to 15*e*, taken together, show a schematic diagram of the programmer operative in FIG. 14;

FIG. 16 is a representation of the voltage output of the servo response potentiometers operative in FIG. 3 to illustrate the theory of eliminating ambiguous latitude positions; and FIG. 17 is a schematic diagram of the original arrangement of $H_t$,$H_w$, $V_t$ and $V_w$ in the dead reckoning computer.

OVERALL OPERATION OF SYSTEM

One embodiment of the invention will be explained with reference to FIGS. 1 to 15. The individual diagrams FIGS. 1 to 13 explain all of the principal modes of operation of the entire system shown in the overall schematic diagram FIG. 14. Some of the basic components shown in FIG. 14 will be shown in various and separate circuit roles and functions in FIGS. 1 to 13 for preselected periods of time as determined by the programmer 20 in FIG. 14. A detailed schematic diagram of programmer 20 is illustrated in FIG. 15 for sequentially switching such basic components in the circuits of FIGS. 1 to 14.

(*A*) *Normal operation*

Figure 1:
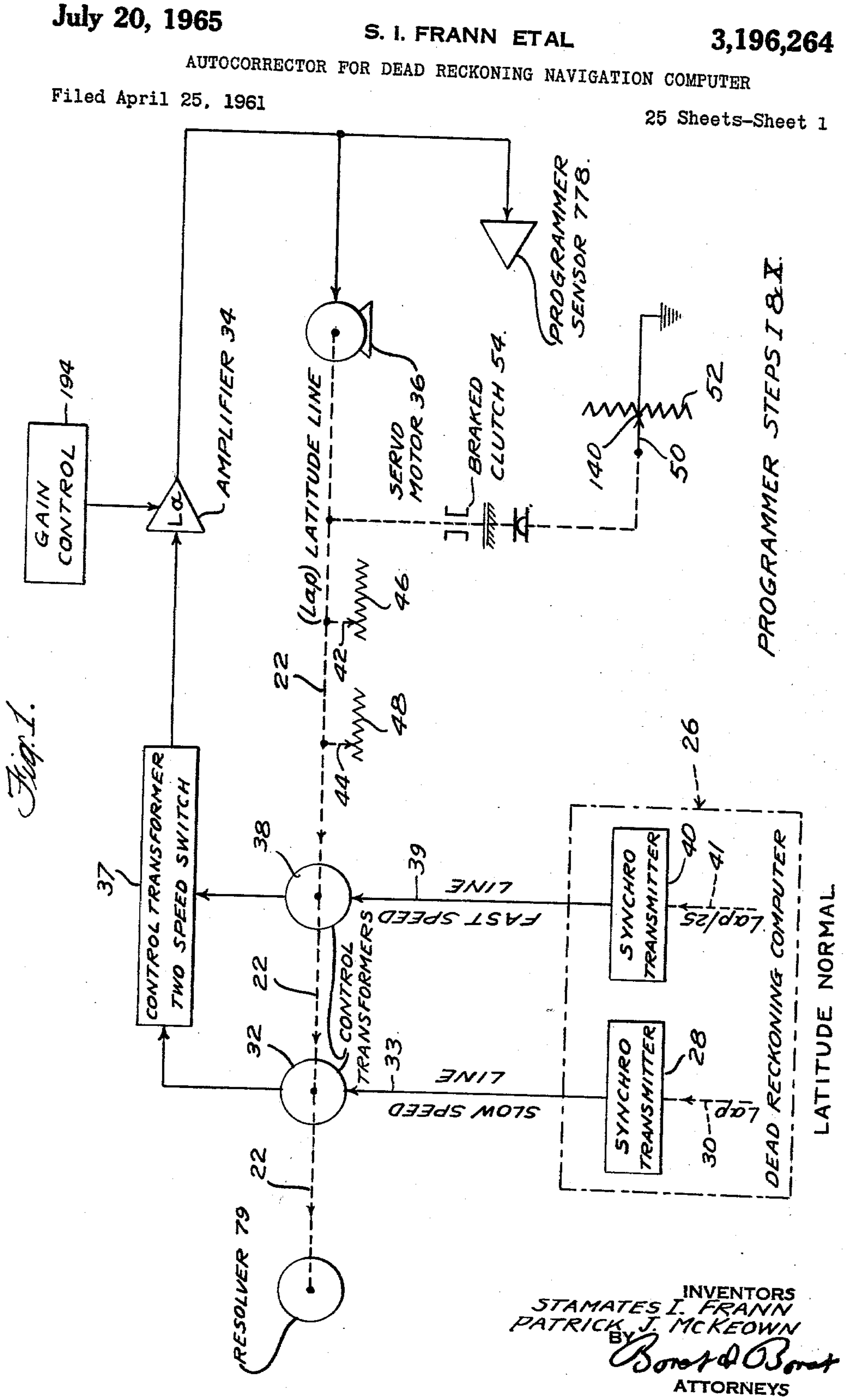
FIG. 1 is a schematic diagram of the system operating to provide continuous dead reckoned present latitude positions of the vehicle.
Figure 2:
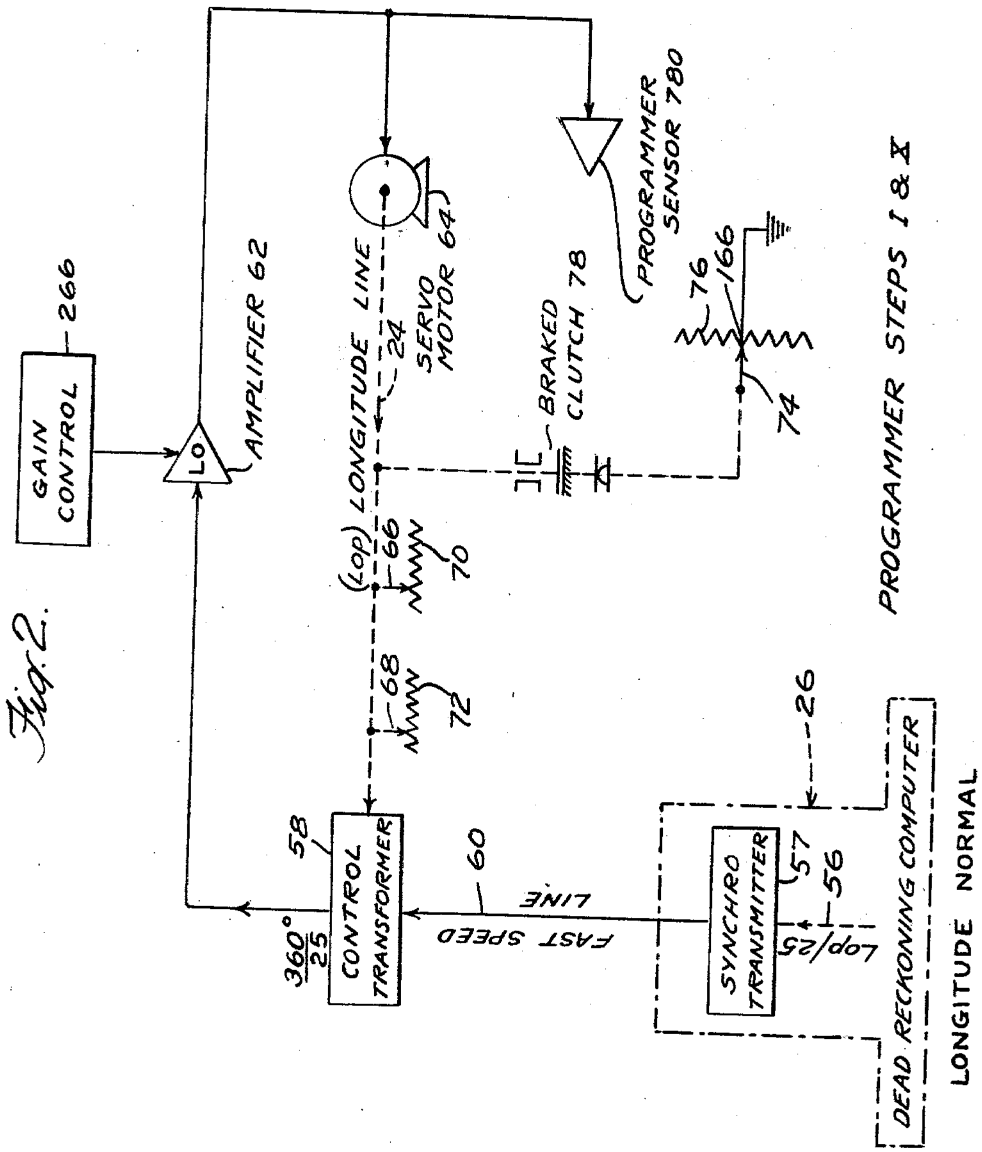
FIG. 2 is a schematic diagram of the system operating to provide continuous dead reckoned present longitude position of the vehicle.

The normal operation of the dead reckoning system is illustrated in FIGS. 1 and 2 which shows the connections effected by steps I and X of the programmer 20 represented as a "block" component in FIG. 14 and detailed in FIG. 15. FIG. 1 portrays the circuit for displaying the present vehicle latitude (Lap) as a displacement of a shaft 22 while in FIG. 2 the present vehicle longitude (Lop) is displayed as a displacement of a shaft 24. In FIG. 1 (and FIG. 14), coupled with a dead reckoning computer 26, which may, for example, be an AN/ASN-7 navigational computer, is a synchro transmitter 28 which is mechanically driven by an output Lap shaft 30 of computer 26 so that 360° of rotation corresponds to 360° of latitude. This Lap information is electrically transmitted by 28 to a control transformer 32 in the autocorrector over a slow speed line 33. This control transformer 32 is the servo control in the latitude servo loop comprising the control transformer 32, a latitude (La) servo amplifier 34, a servo motor 36, and the mechanical link or shaft 22 between 32 and 36. The effect of this closed servo loop is to cause servo motor 36 to drive control transformer 32 until its mechanical position is in approximate correspondence with the mechanical position of synchro transmitter 28. A control transformer two-speed switch 37 senses when this condition is achieved, and causes the servo amplifier 34 to then operate from a control transformer 38 instead of from control transformer 32. Control transformer 38 is electrically controlled over fast speed line 39 by a synchro transmitter 40 associated with the computer 26, transmitter 40 being mechanically driven by latitude Lap information on a computer output shaft 41 at a speed of 25. That is to say, 360° of rotation of shaft 41 corresponds to 360°/25 or 14.4° of latitude. Since control transformer 38 is also mechanically connected to the Lap shaft 22 in the autocorrector at a speed of 25, the latitude servo loop in the autocorrector now drives the latitude line or shaft 22 to a more nearly perfect correspondence with the present latitude information (Lap) generated in the computer 26. This operation sets the position of wipers 42 and 44 of potentiometers 46 and 48, respectively, while wiper 50 of potentiometer 52 is held at its zero position by a braked clutch 54. The purpose served by potentiometers 46, 48 and 52 will be described in a later section.

Simultaneous with the insertion of Lap information in the latitude line 22, present longitude information (Lop) is inserted into the Lop longitude line 24 as shown in FIG. 2 in a manner similar to that of FIG. 1. An output shaft 56 from the computer 26 is displaced by present longitude information Lop at a speed of 25 to drive a synchro transmitter 57 which in turn drives a control transformer 58 over fast speed line 60. This control transformer 58 is the servo control in the longitude servo loop comprising the control transformer 58, a longitude (Lo) servo amplifier 62, a servo motor 64 and the mechanical link or shaft 24 between 58 and 64. The effect of this closed servo loop is to drive the Lop present position line 24 to close correspondence with the present longitude information (Lop/25) generated in the computer 26. Line 24 positions wipers 66 and 68 of potentiometers 70 and 72, respectively, while wiper 74 of a potentiometer 76 is held at its zero position by a braked clutch 78. The purpose served by potentiometers 70, 72 and 76 will be described in later sections. The only significant difference between FIGS. 1 and 2 is the absence in FIG. 2 of the coarse (or slow speed) synchro link for longitude, corresponding to elements 28, 30, 33, 32, 37 in FIG. 1, between the computer 26 and the autocorrector. Since only 25 speed information is transmitted in FIG. 2 there exist 25 ambiguous longitudes all represented by a given position of shaft 24 in the autocorrector (e.g., 0°, 14.4°, 28.8° etc., all of which can be indicated in the autocorrector as being 0°). These ambiguities are not harmful, however, since this information will be used only for small corrections to Lop, and for the difference between Lop and the "fix" longitude Lof. Since this difference and the corrections cannot be greater than 360°/25 or 14.4°, no confusion in actual practice can result from these ambiguities. This is in marked contrast to the latitude line 22 where such ambiguities would be intolerable because the entire value of Lap, and not just the difference Lap–Laf, is required by a resolver 79 as will be explained in connection with FIG. 8.

The insertion of Lap and Lop information into the latitude and longitude lines 22 and 24 of the autocorrector is essentially continuous as the vehicle's position changes, and is interrupted only when a "fix" is received from a source of correct position information as explained in connection with FIG. 3.

(B) *Automatic dead reckoning correction*

Figure 4:
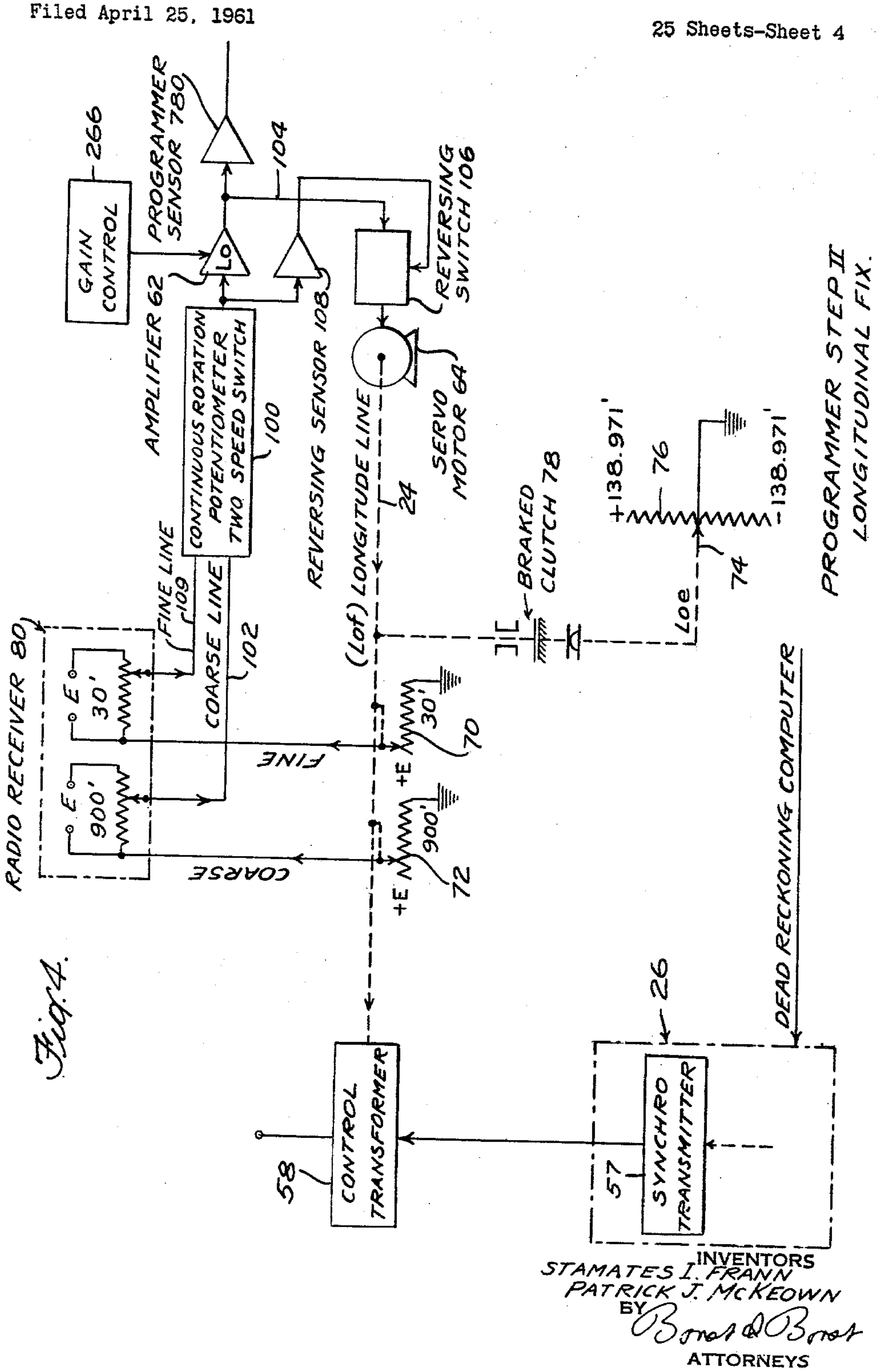
FIG. 4 is a schematic diagram of the system operating to correct the present longitude vehicle position of FIG. 2 upon receipt of correct longitude vehicle positions or "fixes;"

The dead reckoned latitude and longitude positions of the vehicle as indicated by the displacements of the (Lap) latitude line 22 in FIG. 1 and the (Lop) latitude line 24 in FIG. 2 are corrected in FIGS. 3 and 4 when a "fix," or accurate vehicle position information, is received. The "fix" information may be provided by a radio receiver 80, as for example, by a Radio Receiving Set AN/ARR-39, operating in a radio data link with an external transmitter (not shown). The "fix" information can be determined at the transmitter station in many ways, one example being by radar.

The receipt of a "fix" causes the programmer 20 in FIG. 14 to index to step II for establishing the circuits shown in FIGS. 3 and 4. When the programmer is in this step, the input latitude signal to the La servo amplifier 34 is no longer supplied from the control transformers 32 and 38 as in FIG. 1. The La servo amplifier 34 is now supplied with a "fix" information from the receiver 80 and with signals from the potentiometers 46 and 48, the latter preferably being of the "Cropot" type to be described later and energized by a voltage E.

At first, a cropot two-speed switch 86 is in its "coarse" position so that the "coarse fix" information on a lead 88 from the receiver 80 and the coarse servo cropot 48 controls servo motor 36 to drive the latitude line 22 to approximately the fit latitude (Laf). The two-speed switch 86 then automatically changes to its "fine" condition whereby the "fine fix" information on a lead 90 from receiver 80 and the fine cropot 46 causes the latitude line 22 to be driven by servo motor 36 to the exact fix latitude (Laf).

The form of the "fix" signal received from the receiver 80 on leads 88 and 90 and the significance of preferably using potentiometers of the "Cropot" type for elements 46 and 48 will now be explained.

The outputs of the radio receiver 80 are two voltages linearly related to "fix" latitude. In the "coarse" line, the cycle of voltage is repeated every 900 minutes of latitude, and in the "fine" line, the cycle of voltage is repeated every 30 minutes of latitude. In both cases the form of the signal is a stepped sawtooth. It is therefore necessary that the servo response potentiometers 46 and 48 have output voltages in the same form. While many conventional potentiometers can supply a linear relation between voltage and rotation, they will not ordinarily generate a true sawtooth either because of absence of a continuous rotation feature and/or because of excessive dead space near the zero point due to terminal connections and wiper width. A potentiometer which has all of such desirable features is known as "Cropot" (Continuous ROtation POTentiometer) and is disclosed in U.S. Pat. #2,850,604.

The existence of the continuous rotation feature, and the existence of a multiplicity of ambiguous solutions (spaced apart every 900 minutes of latitude) combine to give the servo system the option of either going "forward" to the correct solution or "backward" to the ambiguous solution. It is always desired that the servo run towards the correct nearer solution, because small differences between Lap and Laf are probable, while large differences in the order of magnitude of 900 minutes are almost incredible. The nearer solution is always the correct solution. However, the servo must be urged to run to this solution, since under certain conditions it may tend to servo to the further or ambiguous point. Reference is now made to FIG. 16 which shows the relationship between voltage and latitude, repeating once every 900 minutes (15°).

It will be assumed that the present latitude (Lap) information received from computer 26 is 20°. If the fix latitude is $Laf_1$ it is desired that Lap be corrected to $Laf_1$ at 18° and not to the equivalent ambiguous solution $Laf_1'$ at 33°. This can be readily arranged by suitable normal connections for the servo motor 36, which causes the motor to turn in the proper direction as a result of the excess voltage X of Lap over $Laf_1$. However, these connections would be incorrect if the fix position should be $Laf_2$ at 13°. In the latter case, the excess voltage Y of $Laf_2$ over Lap would cause the system to run in the opposite direction, to $Laf_2'$ at 28° which is the incorrect ambiguous solution. To avoid this, it is preferable to employ the arrangement called "Unlimited Range Servo" as disclosed in U.S. Patent No. 2,861,333, issued November 18, 1958. By employing such arrangement, whenever the difference voltage, such as X or Y, between Lap and Laf exceeds half the maximum voltage E, the connections to the servo motor 36 are reversed, so that Lap would be corrected to $Laf_2$ at 13° and not to $Laf_2'$ at 28° for the facts assumed in connection with FIG. 16. This prevents the servo motor 36 from ever driving to a fix solution more than 450 minutes away from Lap. The circuit for accomplishing this includes a reversing sensor 92 in FIGURE 3. The actual reversing of motor 36 is accomplished by a reversing switch 94 in the circuit 96 from the La amplifier 34.

The effect of the above circuitry is that the latitude line 22 (including cropots 46 and 48, and control transformers 32 and 38) which had been set to Lap in FIG. 1 is now reset to Laf in FIG. 3. It is desired, however, while this "fix" correction is being made, that the magnitude of the correction (or error) be memorized for later use in computing an "error wind." This is accomplished using the potentiometer 52 which is driven from the latitude line 22 thru clutch 54.

The quantity to be memorized is Lae, the latitude error; viz., $Lae=Lap-Laf$. The initial setting of potentiometer 52 is zero, and it was held at this position during step I of the programmer 20 (FIGS. 14 and 15) when the latitude line 22 was being driven to Lap. During the obtaining of a latitude fix, the programmer 20 on step II closes clutch 54. Clutch 54 remains in the closed position while the latitude line is being driven from Lap to Laf. The motion of potentiometer 52 is therefore *Lap—Laf*, or *Lae*. The error latitude (up to 50 minutes in either direction) is stored on 52.

As the position of latitude shaft 22 is corrected by the operation of a latitude fix Laf, the longitude shaft 24 is moved to a corrected position in a similar manner by a longitude fix Lof from radio receiver 80 as illustrated in FIG. 4. At first, a cropot two-speed switch 100 is in its "coarse" position so that its input side receives the "coarse fix" information, on a lead 102, from both the receiver 80 and the coarse servo potentiometer 72, the latter (as well as potentiometer 70) preferably being of the "Cropot" type described hereinabove and energized by the voltage E. Switch 100 controls servo motor 64 through Lo amplifier 62 over circuit 104 to drive the longitude line 24 to approximately "fix longitude" (Lof). A reversing switch 106 in circuit 104 is actuatable by a reversing sensor 108 to prevent the longitude line 24 from being driven to an erroneous position as explained with reference to FIG. 16. The two-speed switch 100 then automatically changes to its "fine" condition whereby the "fine fix" information on lead 109 from radio receiver 80 and the "fine" cropot 70 causes the longitude line 24 to be driven by servo motor 64 to the exact "fix longitude" (Lof).

For storing the longitude error (Lof), the potentiometer 76 is driven in either direction, up to 138.97 minutes, by selected engagement of braked clutch 78 in a manner similar to the storing of the latitude error (Laf) on potentiometer 52 in FIG. 3. The extended coverage for Loe (138.97) as compared to Lae (50′) is designed to permit an equal correction in miles at higher latitudes in the east-west direction as in the north-south direction despite the convergence of the meridians. This applies for the amount of extended coverage provided up to 69° north or south latitude, which encompasses substantially the entire habitated area of the earth. The precise value 138.97 of extended coverage mentioned above is a convenient one considering readily available gear ratios and scale factors.

(C) *Transmission of fix information to the navigational computer*

In the previous section (B), the insertion of "fix" information into the latitude 22 and longitude 24 lines of the autocorrection device was described with reference to FIGS. 3 and 4. The next step in the operation, on step III of the programmer 20, is to transmit such information to the navigational computer 26.

Figure 5:
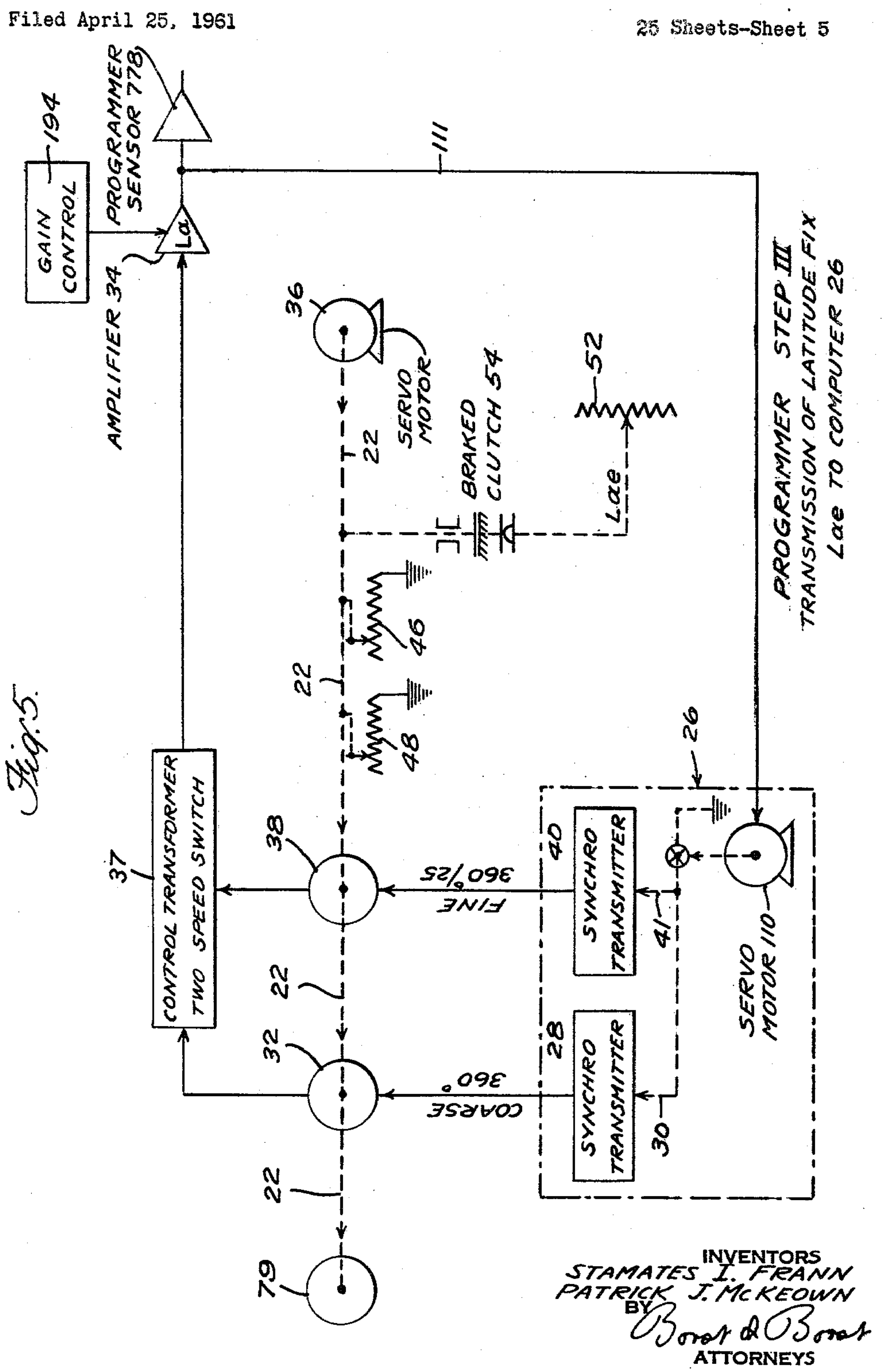
FIG. 5 is a schematic diagram of the system operating to correct the latitude information in the dead reckoning equipment after receipt of correct latitude fix information.
Figure 6:
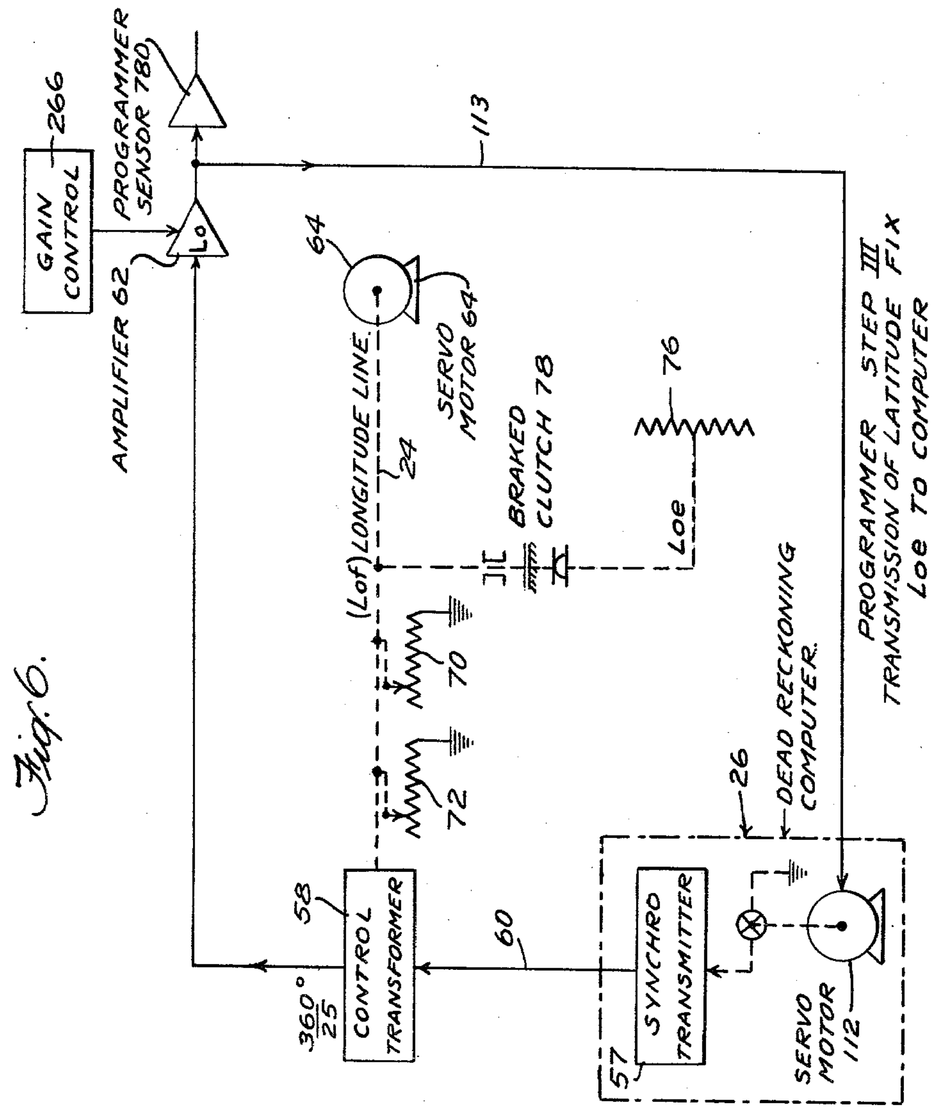
FIG. 6 is a schematic diagram of the system operating to correct the longitude information in the dead reckoning equipment after receipt of correct longitude fix information.

The circuit arrangements in FIGS. 5 and 6 for transmitting information from the corrected position of the latitude line 22 and longitude line 24 to the navigation computer 26 is quite similar to the procedure that was used for transmitting information in the opposite direction, as shown in FIGS. 1 and 2. The only difference is that the outputs on leads 111, 113 of the servo amplifiers 34 and 62, respectively, instead of causing the servo motors 36 and 64 in the correction equipment to drive the latitude and longitude lines 22 and 24 to correspondence with the dead reckoned output of navigational computer 26 as in step I, now in step III, causes servo motors 110 (FIG. 5) and 112 (FIG. 6) in the navigational computer 26 to be driven to correspondence with the corrected positions in FIGS. 3 and 4 of latitude line 22 and longitude line 24, respectively. In this manner, the fix information originally received from the receiver 80 is inserted into the navigational computer 26.

(D) *Computation of wind and its memorization*

This operation is performed when the programmer 20 (FIGS. 14 and 15) is indexed to step IV and requires basically the following:

(a) Obtaining from the navigational computer 26 the wind information which that computer has been using for its wind computations, (b) Calculating the "error wind" from the error latitude Lae and the error longitude Loe, taking into account the length of time during which this error accumulated, and (c) Adding the two winds to obtain a new corrected wind, which is memorized until a later step when it will be inserted into the navigational computer 26 for displaying true wind heading and wind velocity acting on the vehicle.

Wind is a vector quantity having magnitude and direction. Since in general the wind obtained from the navigational computer 26 is not colinear with the "error wind," the addition can be most readily effected thru addition of the coordinate components of the winds (north-south and east-west), and subsequent recombination of components.

The obtaining of the north-south component of the corrected wind will now be explained, with reference to FIGURE 7.

Wind information is stored in the navigational computer 26 in the form of two shaft positions, one shaft 117 (see also FIG. 14) representing wind velocity ($V_w$) and the other shaft 118 representing wind heading ($H_w$).

In order to obtain the north-south component of wind as previously used by computer 26, a cosine winding 119 of a resolver 120, which is driven by the shaft 118 in correspondence with the quantity $H_w$, is used to excite a potentiometer 122 which is driven by the shaft 117 in correspondence with the quantity $V_w$. The output on wiper 123 and lead 126 of potentiometer 122 is therefore $V_w \cos H_w$, which is the north-south wind component as used by the navigational computer 26. This information is transmitted electrically to the correction device.

It is now necessary to convert the error in latitude (Lae) which had been computed in programmer step II above into a north wind component. The quantity Lae is available as the shaft position of potentiometer 52, previously explained in connection with FIG. 3. In order that the output voltage of this potentiometer represent wind, it is necessary that its voltage gradient, and therefore its excitation, be inversely proportional to the time ($\Delta t$) which has elapsed while such error has been accumulating. This is accomplished by using a constant voltage source in the form of a locked rotor resolver 128 and by having the total resistance of the circuit containing potentiometer 52 vary in proportion to time. Hence, the current in the circuit, and consequently the voltage gradient in potentiometer 52, will be inversely proportional to time. As shown in FIG. 7, locked rotor resolver 128, potentiometer 52 and a variable resistor 130 (hereinafter referred to as the time potentiometer) are connected in a series circuit 132. If it is assumed that intervals only between "fixes" of 10 and 30 minutes will be considered, a variation of total resistance in circuit 132 of 3:1 will be adequate in order to, among other reasons, avoid in circuit 132 the impossibilities of zero or infinite resistance. The relationship between the resistances of 52 and 130 can be deduced from the following relationships. The maximum resistance in circuit 132 occurs when the time interval is 30 minutes, and consists of 52 plus 130. The minimum resistance of circuit 132 occurs when the time interval is 10 minutes and consists only of 52. As a matter of preference, the minimum circuit resistance should be one third of the maximum circuit resistance. Therefore:

$$R\ \text{max}=\text{resistance } 52+\text{resistance } 130$$
$$R\ \text{min}=1/3\ R\ \text{max}=\text{resistance } 52$$

consequently:

$$\text{Resistance } 52=1/2 \text{ resistance } 130$$

The driving of potentiometer 130 so that its resistance varies linearly with time is accomplished as now described.

Since the time during which the error Lae in latitude was accumulated started with a "first" fix, and stopped with the "last" fix, it is desired that shaft 136 of time potentiometer 130 will start to turn at each "first" fix and continue to turn until the next "computation" fix is received. However, no motion of time potentiometer 130 from its end stop should occur during the first 10 minutes. This is accomplished by providing mechanical linkages to drive shaft 136 by a timing motor 210 (see FIG. 14). A cam 222 on timing motor 210 trips a switch 228 after 10 minutes, such switch 228 energizing a clutch 218 which mechanically connects shaft 136 and the wiper 142 of 130 to timing motor 210 through mechanical linkages.

Since the distance from the wiper 50 to a center point 140 of 52, as displaced by the output of clutch 54 (see FIG. 3), is proportional to Lae, and since the voltage gradient 52 has now been made inversely proportional to $\Delta t$ (within the limits of 10 to 30 minutes), the voltage from wiper 50 to center point 140 is $Lae/\Delta t$. By providing that the voltage from center point 140 of 52 to ground equals $V_w \cos H_w$ (as previously explained), the total voltage from wiper 50 of 52 to ground is the desired total corrected wind component in the north-south direction. Since the total corrected wind is defined as $V_{wc}$ at a heading of $H_{wc}$, it follows that:

North-South component of corrected wind $=V_{wc} \cos H_{wc}$ $$V_{wc} \cos H_{wc}=Lae/\Delta t+V_w \cos H_w =V_{wf} \cos H_{wf}+V_w \cos H_w$$

where $$Lae/\Delta t=V_{wf} \cos H_{wf}$$

This information is now available in electrical form on the wiper 50 of potentiometer 52. For memorization, it is desired that this signal be mechanized, i.e., stored in mechanical form on a potentiometer 146. This is accomplished by a servo loop comprising the latitude servo amplifier 34, a servo motor 144 and the servo memory potentiometer 146, the latter being energized from a locked rotor resolver 147 while a center tap 148 of 146 is connected to the wiper 50 of potentiometer 52. This establishes a self-balancing circuit where a wiper 149 of 146 will be positioned mechanically to equal the voltage existing on the wiper 50 of potentiometer 52.

Figure 7:
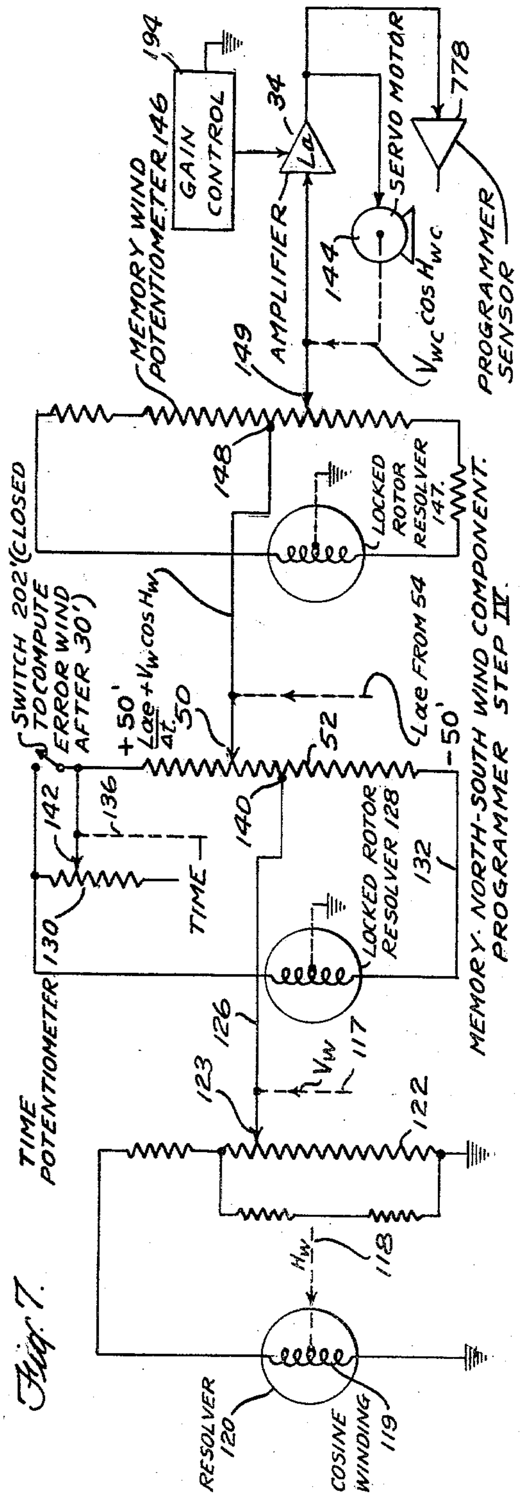
FIG. 7 is a schematic diagram of the system operating to compute the north-south component of the true wind acting on the vehicle and to store such information.
Figure 8:
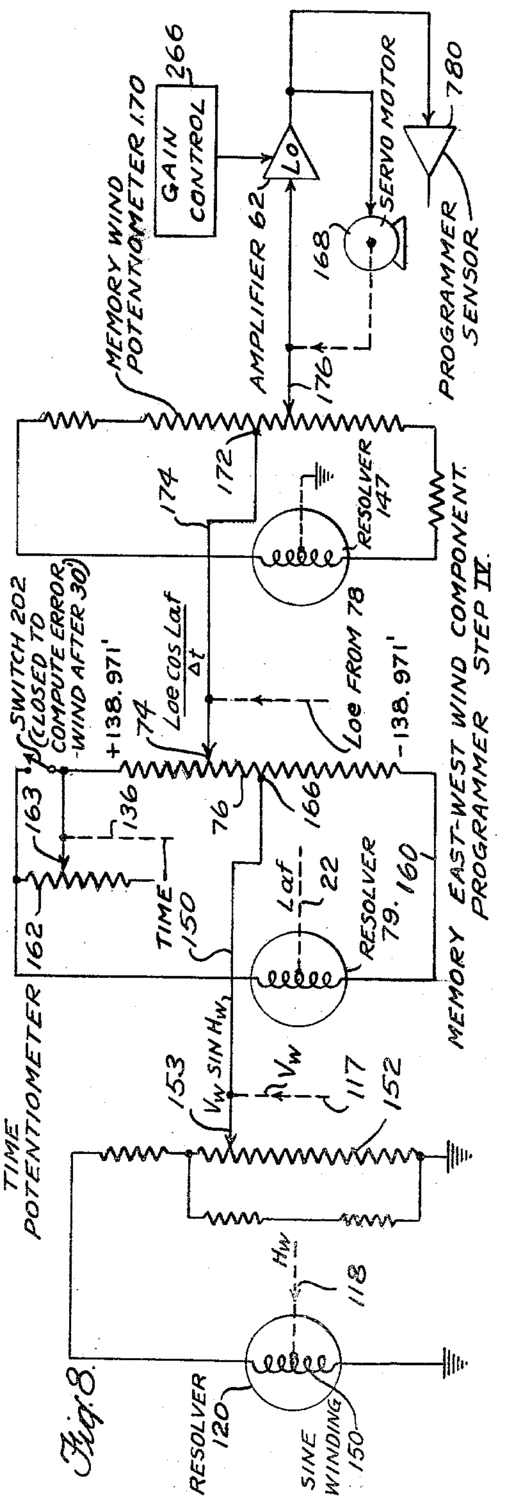
FIG. 8 is a schematic diagram of the system operating to compute the east-west component of the true wind acting on the vehicle and to store such information.

Simultaneously with the operation just described for obtaining the north-south component of the true wind as shown in FIG. 7, the east-west component of the true wind is also being obtained as shown in FIG. 8.

In order to obtain the east-west component of the wind information previously used by computer 26, a sine winding 150 of the resolver 120 which is driven by the shaft 118 in correspondence with $H_w$ from computer 26 as used to excite a potentiometer 152 whose wiper 153 is driven by the shaft 117 in correspondence with $V_w$ from computer 26. The output on lead 154 of potentiometer 152 is therefore $V_w \sin H_w$.

There are two principal differences between the circuits in FIG. 8 as compared to FIG. 7.

One difference is that the range of the Loe potentiometer 76 (see also FIG. 4) is 138.971 minutes, as compared to the 50 minutes range of the Lae potentiometer 52 (see also FIG. 3). The reason for this was explained previously.

The other difference is that the equation for east-west wind contains an extra term not present in the equation for north-south wind; viz., cos Laf. The equation for corrected east-west wind is as follows:

$$V_{wc} \sin H_{wc}=(Loe \cos Laf)/\Delta t+V_w \sin H_w$$

where cos Laf is the conversion of longitude minutes to east-west miles.

The reason for the extra term, cos Laf, will now be explained. In the case of north-south wind, the fact that a minute of latitude equals almost exactly one nautical mile permits the ratio $Lae/\Delta t$ to equal a "wind," measured in knots. However, this cannot be done as simply for east-west wind because of the convergence of the meridians. Specificially, the number of minutes of longitude multiplied by the cosine of latitude equal distance in miles. Therefore, in the equation for east-west wind, the longitude error (Loe) must be multiplied by either (ideally) the mean cosine of the latitude change during the time the error accumulated, or (as an adequate approximation) the cosine of the fix latitude (Laf).

The method by which the term cos Laf is inserted into the solution is shown in FIG. 8. For north-south wind (FIG. 7), the circuit 132 containing the Lae potentiometer 52 and the time potentiometer 130, was energized with a fixed voltage from the locked rotor resolver 128. For east-west wind, the corresponding circuit 160 containing the Loe potentiometer 76 (see also FIG. 4) and a time potentiometer 162 is energized with a voltage proportional to cos Laf from the resolver 79 (see FIG. 3) which is mechanically driven to angle Laf by the latitude line 2. The time potentiometer 162 is driven from the same shaft 136 driving the time potentiometer 130.

Lead 150 containing information $V_w \sin H_w$ is connected to a center tap 166 of Loe potentiometer 76 while its wiper 74 is driven from the output of clutch 78 (see FIG. 4). The information $$\frac{Loe \cos Laf}{\Delta t} + V_w \sin H_w$$

on wiper 74 is stored by a servo loop comprising the longitude servo amplifier 62, a servo motor 168 and a memory potentiometer 170. Memory potentiometer 170 is energized from the locked rotor resolver 147 and its center tap 172 is connected to the wiper 74 of poteniometer 76 by lead 174. This establishes a self-balancing circuit where a wiper 176 of 170 will be positioned mechanically to equal the voltage existing on wiper 74 of potentiometer 76.

Programmer step IV is now concluded, with the north-south and east-west components of the true or corrected wind stored on potentiometers 146 (FIG. 7) and 170 (FIG. 8), respectively.

*(E) Display wind heading*

It is now desired to insert the corrected wind heading into the navigational computer 26. This information can be computed from the components stored on potentiometers 146 (FIG. 7) and 170 (FIG. 8), and the resultant will be stored as the shaft position of the resolver 120 in the navigational computer. This operation is accomplished in FIG. 9 when the programmer 20 is indexed to step V.

Resolver 120 is initially at an angle $\theta = H_w$ as set by shaft 118 of the dead reckoning computer 26 which in general will not be equal to the correct angle $H_{wc}$. The output of this resolver's cosine winding 119 is used to energize potentiometer 170, whose wiper's 176 position is determined by $V_{wc} \sin H_{wc}$. The output voltage of this potentiometer is therefore $V_{wc} \sin H_{wc} \cos \theta$. Similarly, potentiometer 146 is excited with $\sin \theta$ from sine winding 150 of resolver 120. By subtracting the two potentiometer output signals, we obtain on lead 180

$$V_{wc}[\sin H_{wc} \cos \theta - \cos H_{wc} \sin \theta]$$

which from trignometric identity is equal to $V_{wc} \sin (H_{wc} - \theta)$. This signal is applied thru servo amplifier 34 to a servo motor 182 which drives 120 until $V_{wc} \sin (H_{wc} - \theta)$ equals zero. Ignoring the trivial special case of $V_{wc} = 0$, this will occur when $H_{wc} = \theta$ and ($\sin \theta = 0$), that is, when shaft 118 of resolver 120 has been driven to the correct wind heading.

Given $\theta = H_w$ (original setting of 120)
$\theta = H_{wc}$ (after servoeing)
therefore $H_w = H_{wc}$ (new setting of 120)

*(F) Display wind velocity*

Figures 9, 10:
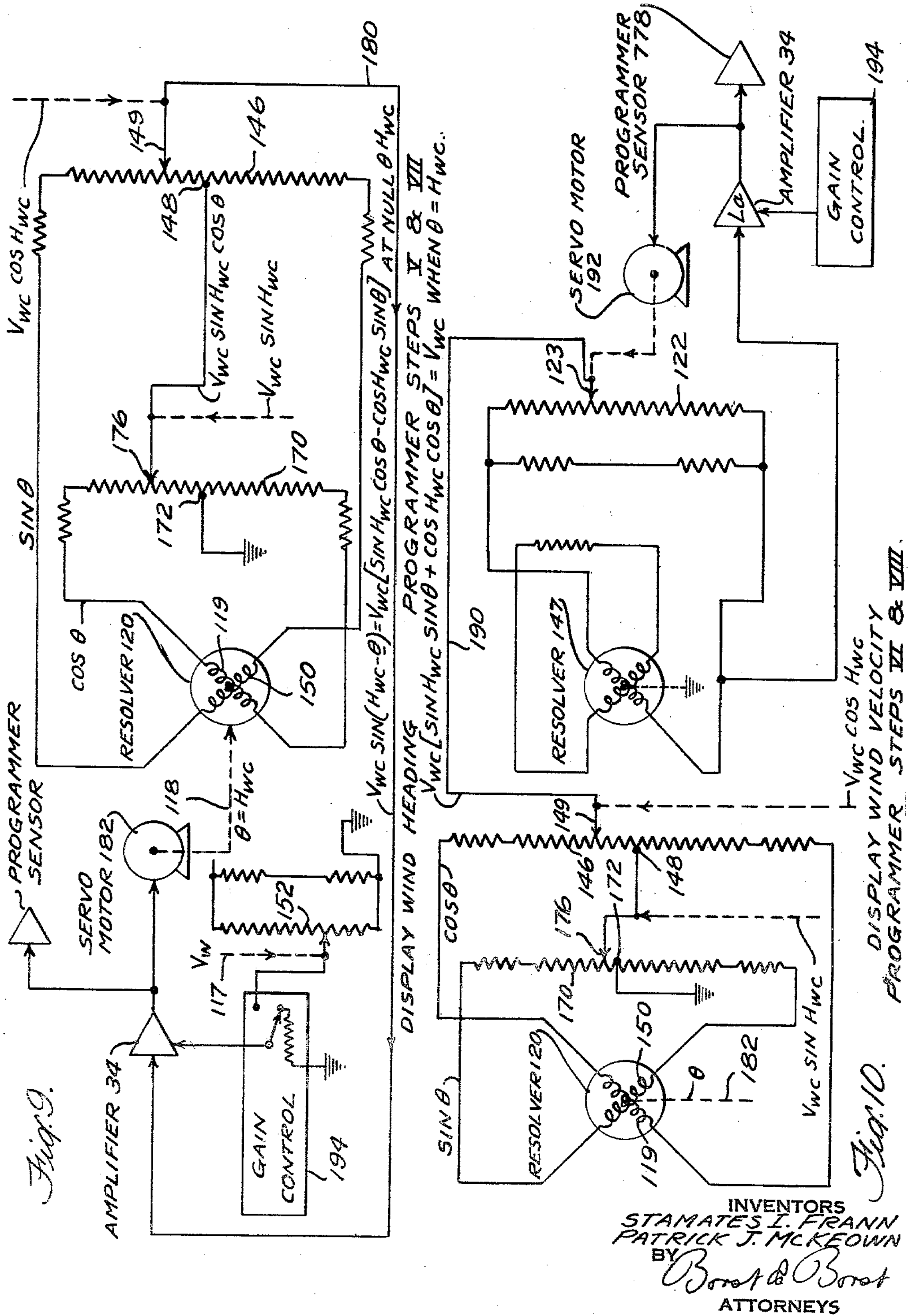
FIG. 9 is a schematic diagram of the system operating to compute, display and insert into the dead reckoning computer the true heading of the wind acting upon the vehicle from the voltages as provided by FIGS. 7 and 8.
FIG. 10 is a schematic diagram of the system operating to compute, display and insert into the dead reckoning computer the true wind velocity acting on the vehicle from the voltages as provided by FIGS. 7 and 8.

The purpose of step VI of programmer 20 is to insert the corrected wind velocity into the navigational computer 26 as shown in FIG. 10.

In order to do so, it is necessary to interchange the connections from resolver 120 to memory potentiometer 146 and memory potentiometer 170 so that sine winding 150 will energize 170, and cosine winding 119 will energize 146 (instead of vice versa as shown in FIG. 9). Also reversal of connections are necessary so that the sum of the outputs of 170 and 146 is formed (instead of the difference as in FIG. 9). The resulting electrical signal on a lead 190 is:

$$V_{wc}(\sin^2 H_{wc} + \cos^2 H_{wc}) = V_{wc}$$
$$(\sin^2 H_{wc} + \cos^2 H_{wc}) = 1$$

The true wind velocity information is stored on potentiometer 122 using the latitude servo amplifier 34 and a servo motor 192 in a self-balancing servo loop where the wiper 123 of 122 is mechanically positioned to correspond to the electrical value of the wiper 149 of 146.

*(G) Interrelationship of velocity and heading computations*

The explanations in Section (E) and (F) were oversimplified to the extent that they ignored the interrelationship between the solutions for $V_{wc}$ and $H_{wc}$. Consider the two equations:

Step V (FIG. 9), $V_{wc} \sin (H_{wc} - \theta) = 0$ or $H_{wc} = \theta$
Step VI (FIG. 10),
$V_{wc}(\sin H_{wc} \sin \theta + \cos H_{wc} \cos \theta = V_{wc}$ It is clear, as has been mentioned previously, that the solution for programmer step VI depends upon programmer step V having already been completed. It has not been mentioned, but it is true that an accurate solution of step V requires that step VI be already completed. This results from the mathematical considerations that the equations are "simultaneous" equations (disregarding the trivial condition where $V_{wc} = 0$ for which there is no solution for $\theta$) and, more importantly, from the fact that proper servo operation during solution for step V required that servo amplifier gain be a function of $V_{wc}$, which is not obtained until step VI. In other words, step V required step VI and step VI requires step V.

The following method is used to avoid this difficulty and the necessity for a simultaneous solution for both $V_{wc}$ and $H_{wc}$ which would require many more components than those mentioned or readily available.

In step V, (FIG. 9) an approximate solution is obtained using an average value of servo gain as effected by a gain control 194 controlling La amplifier 34. Since this gain value is most likely incorrect, the solution would only be approximate. This approximate solution in step V permits an approximate solution to be achieved in step VI (FIG. 10). This now permits step V to be repeated (to be called programmer step VII) with now effectively near perfect results. It is to be noted that the error in step VI will not significantly affect step VII since amplifier gain in the servo loop is not a critical parameter. The effectively near perfect results from step VII permit step VI to be repeated (to be called step VIII) with more than adequate accuracy.

*(H) Reset of time potentiometers 130 and 162*

Since only one of the servo amplifiers, the La amplifier 34, is used in the display of wind (steps V, VI, VII and VIII), the other servo amplifier, the Lo amplifier 62, is used simultaneously for reset of the time potentiometers 130 and 162. This is accomplished in FIG. 11.

The voltage from the locked rotor resolver 128 is applied to the ends of time potentiometer 130. Ten (10) minutes tap 196 is grounded and the voltage on the wiper 142 is fed through longitude Lo servo amplifier 62 to a reset motor 134, which drives time line 136 to a null at the 10 minutes tap. This is a single ended self-balancing servo. Since the wiper 163 of potentiometer 162 is ganged to the wiper 142 of potentiometer 130, both time potentiometers will be reset simultaneously.

*(I) Reset of the Lae and Loe error poteniometers*

Figure 13:
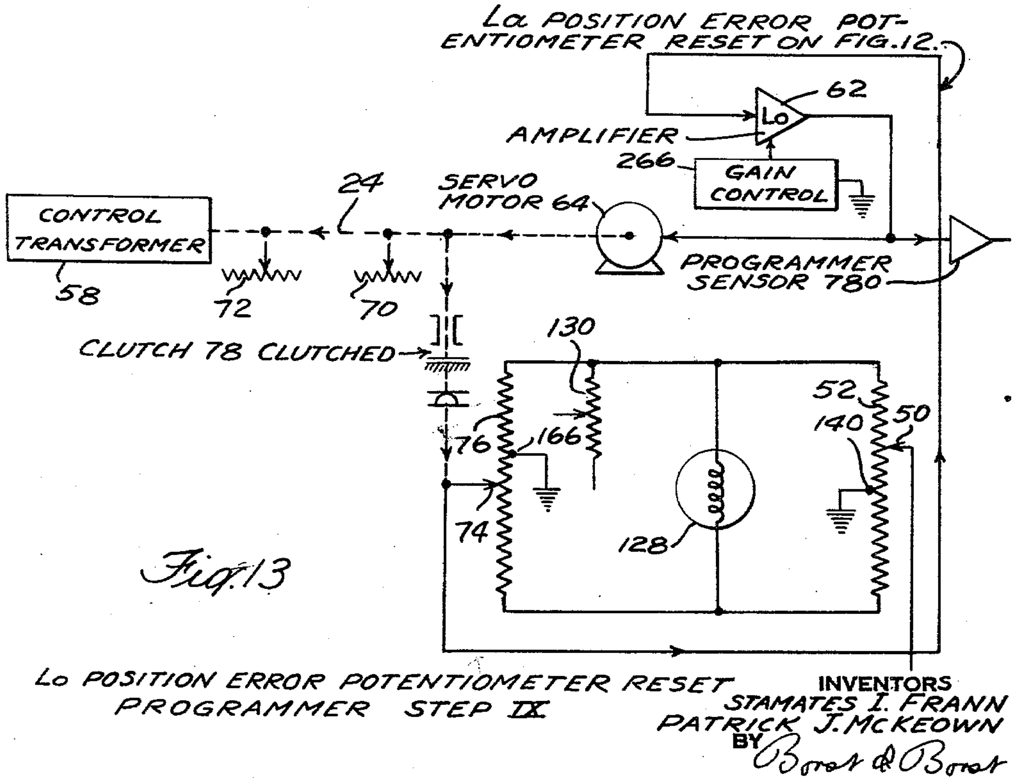
FIG. 13 is a schematic diagram of a portion of the system components operating to reset the longitude error position potentiometer after a computation of the error wind.
Figure 12:
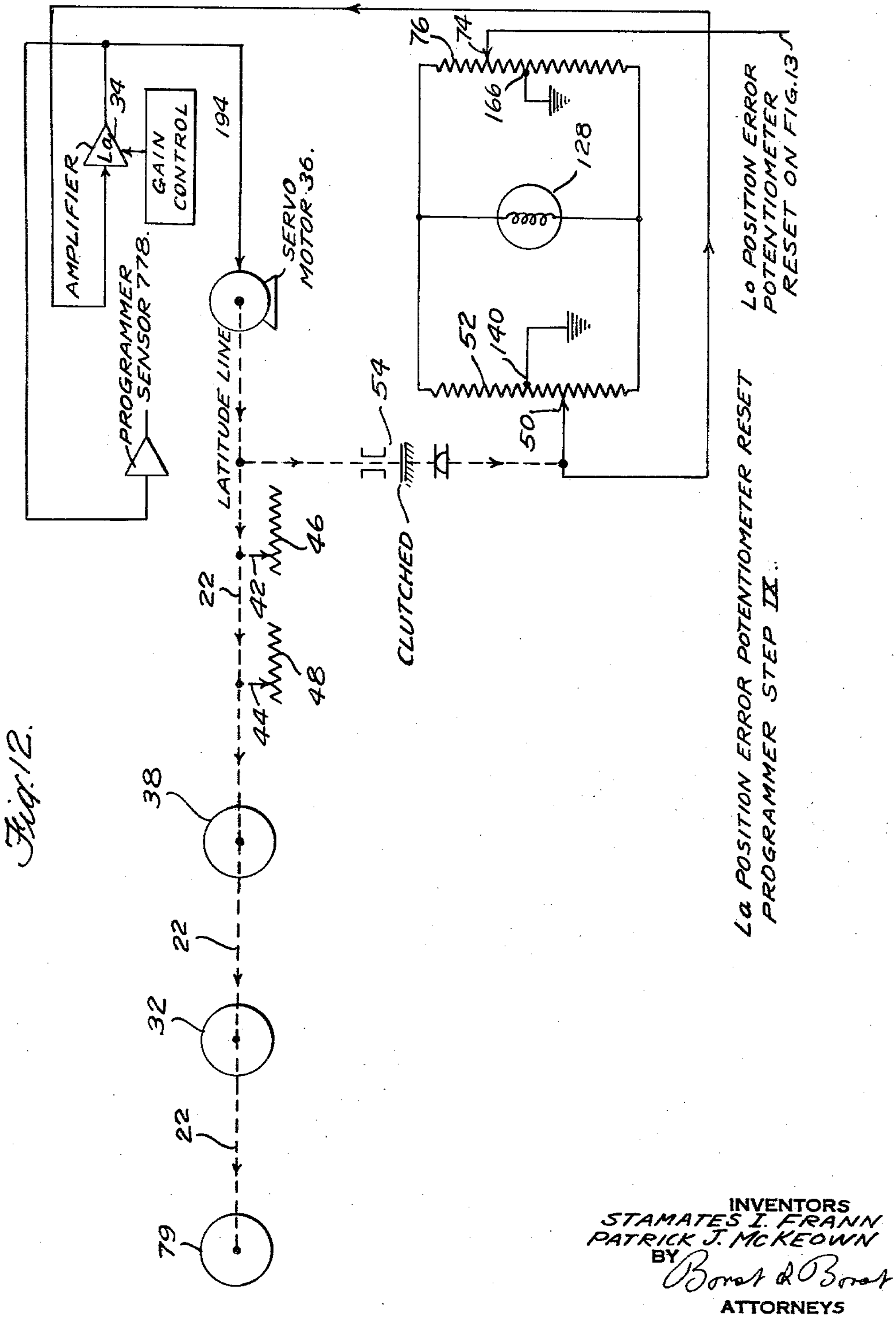
FIG. 12 is a schematic diagram of a portion of the system components operating the reset the latitude error position potentiometer after a computation of the error wind.
Figure 14A:
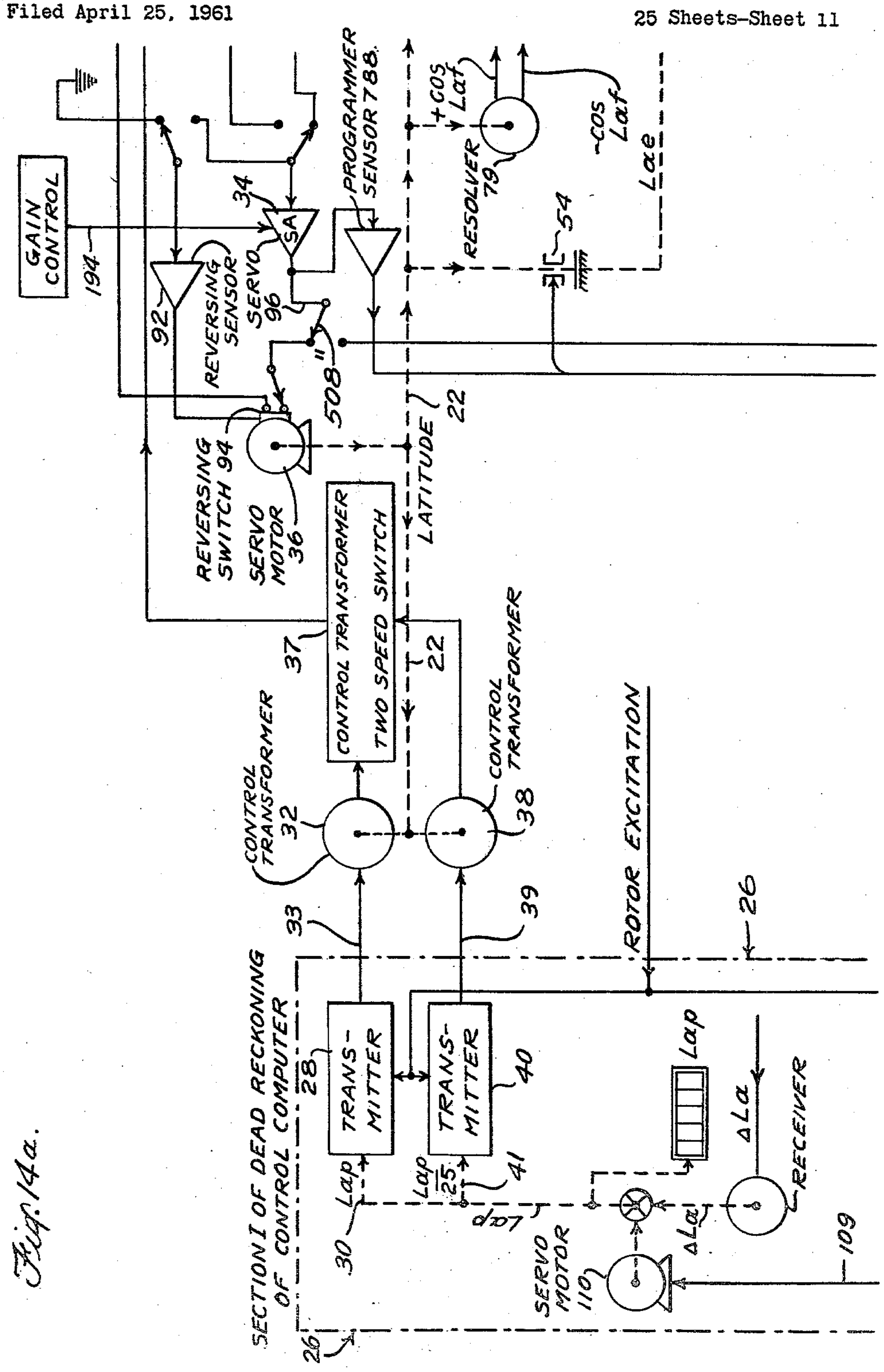
Figure 14B:
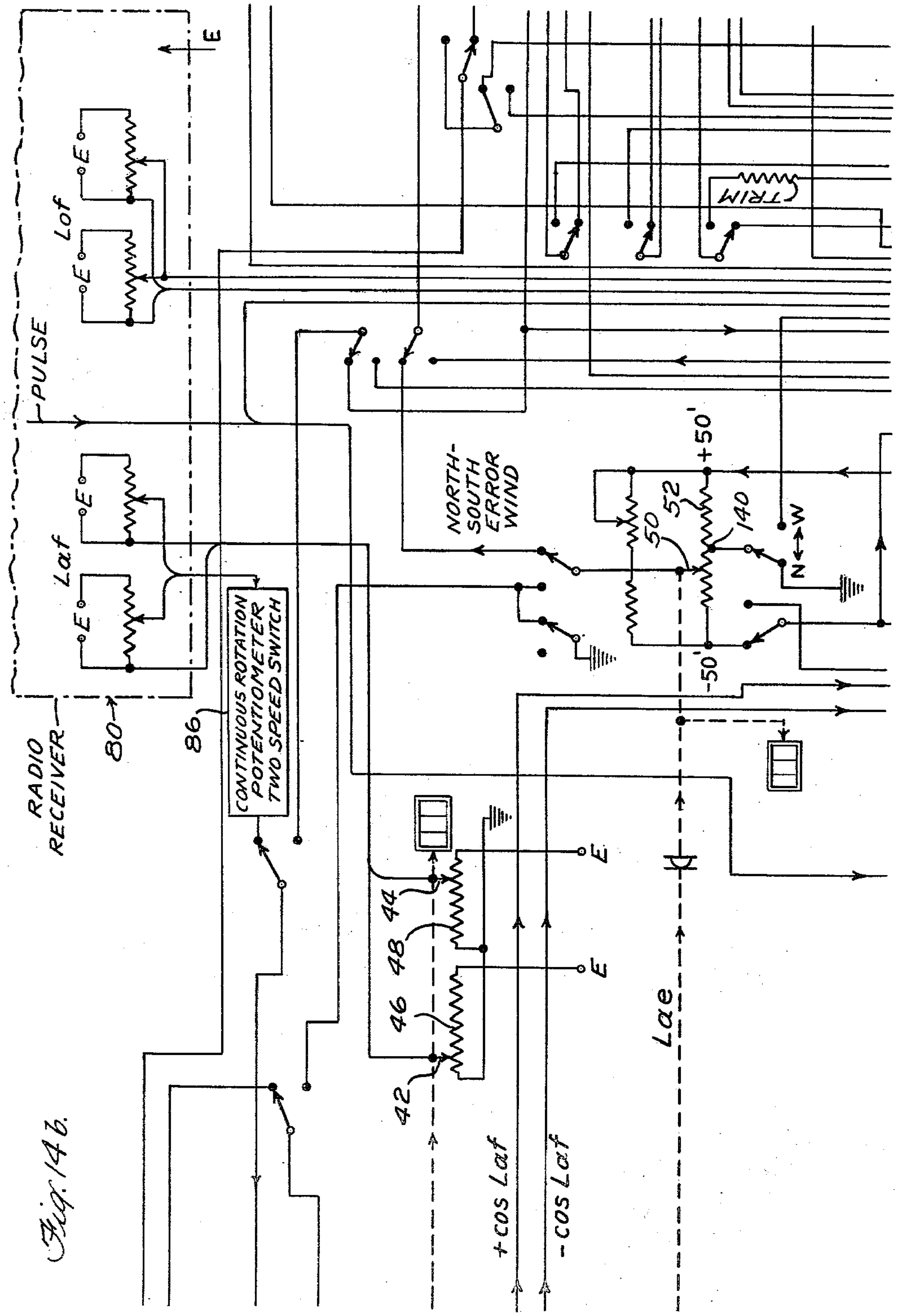
Figure 14C:
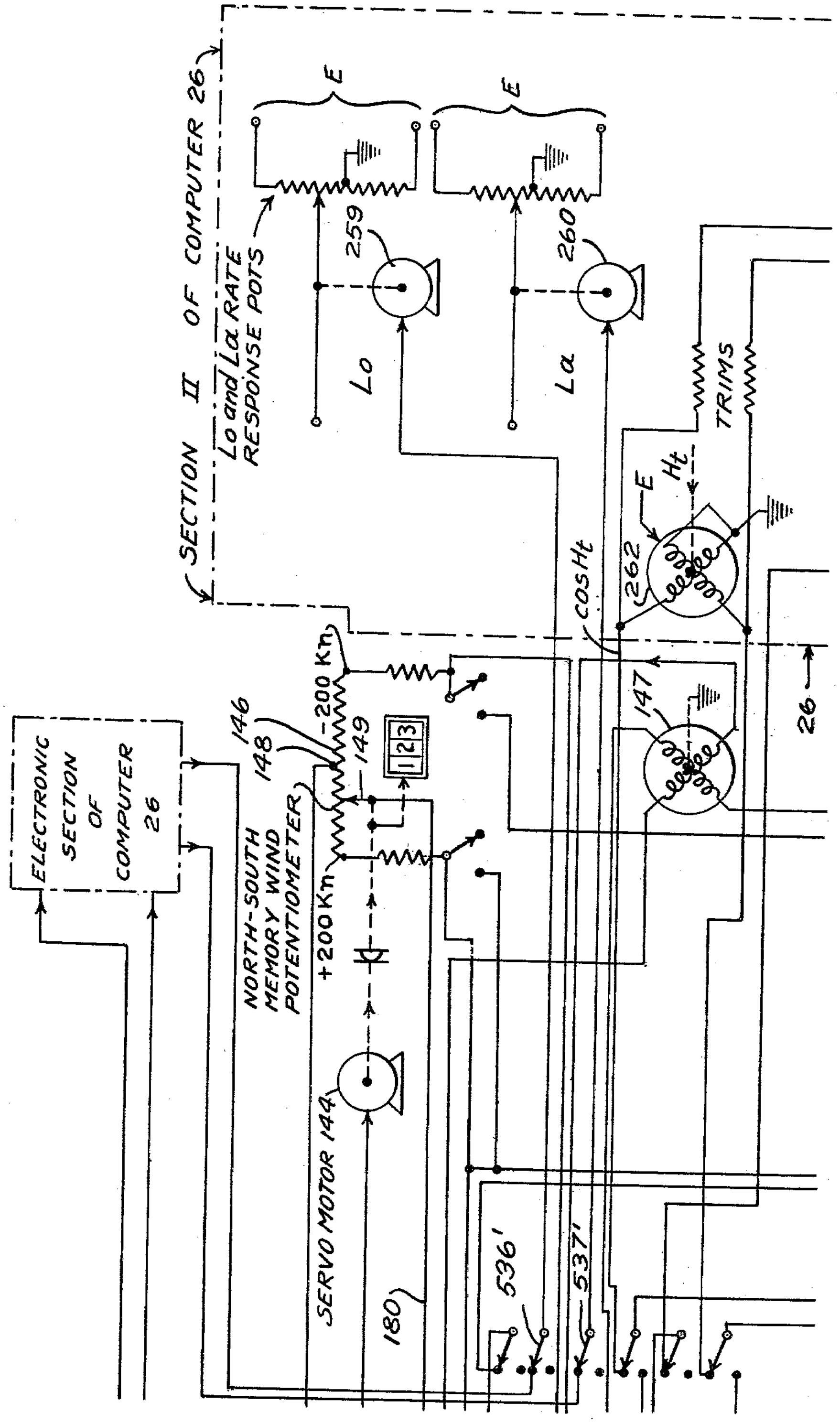
Figure 14D:
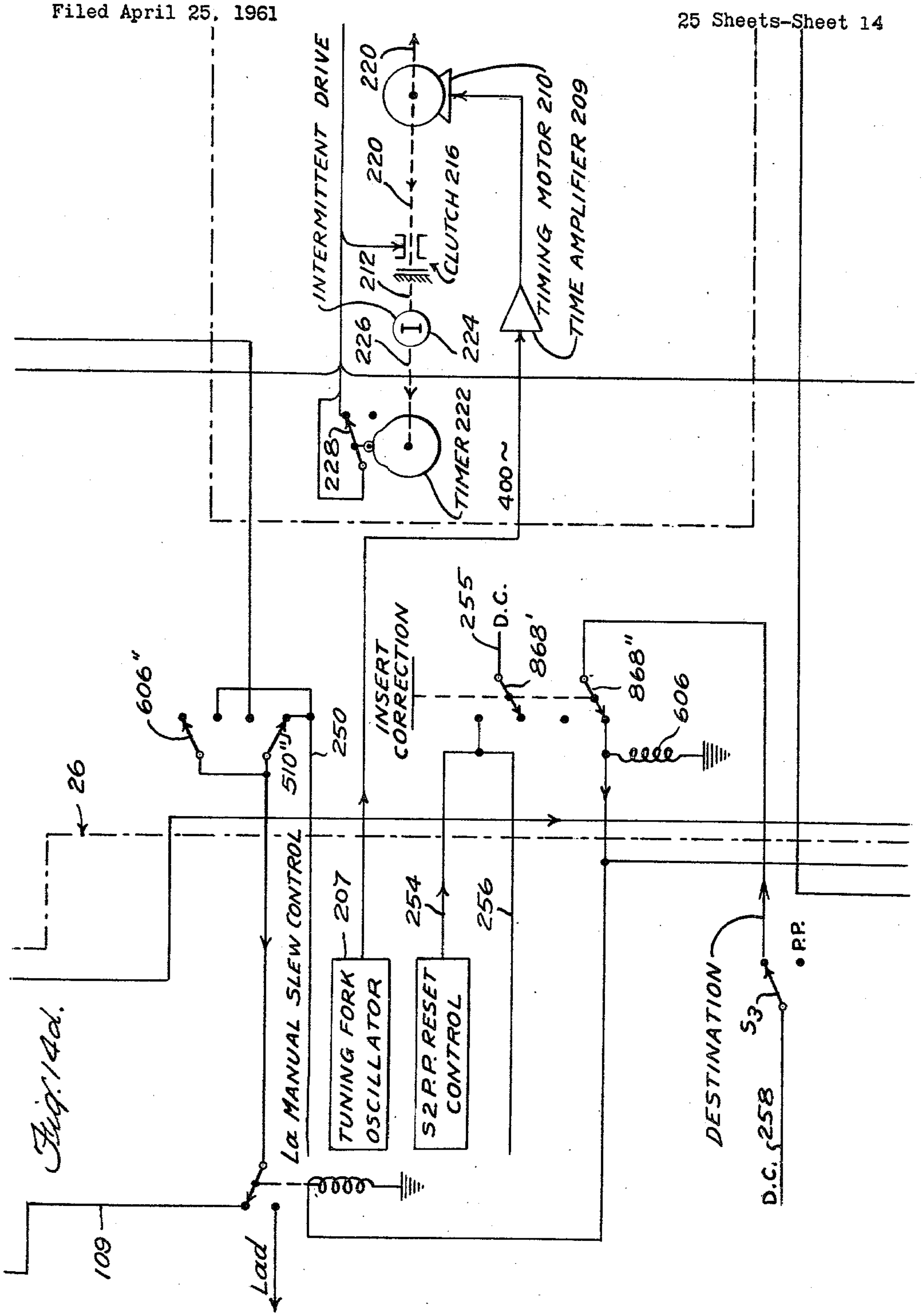
Figure 14E:
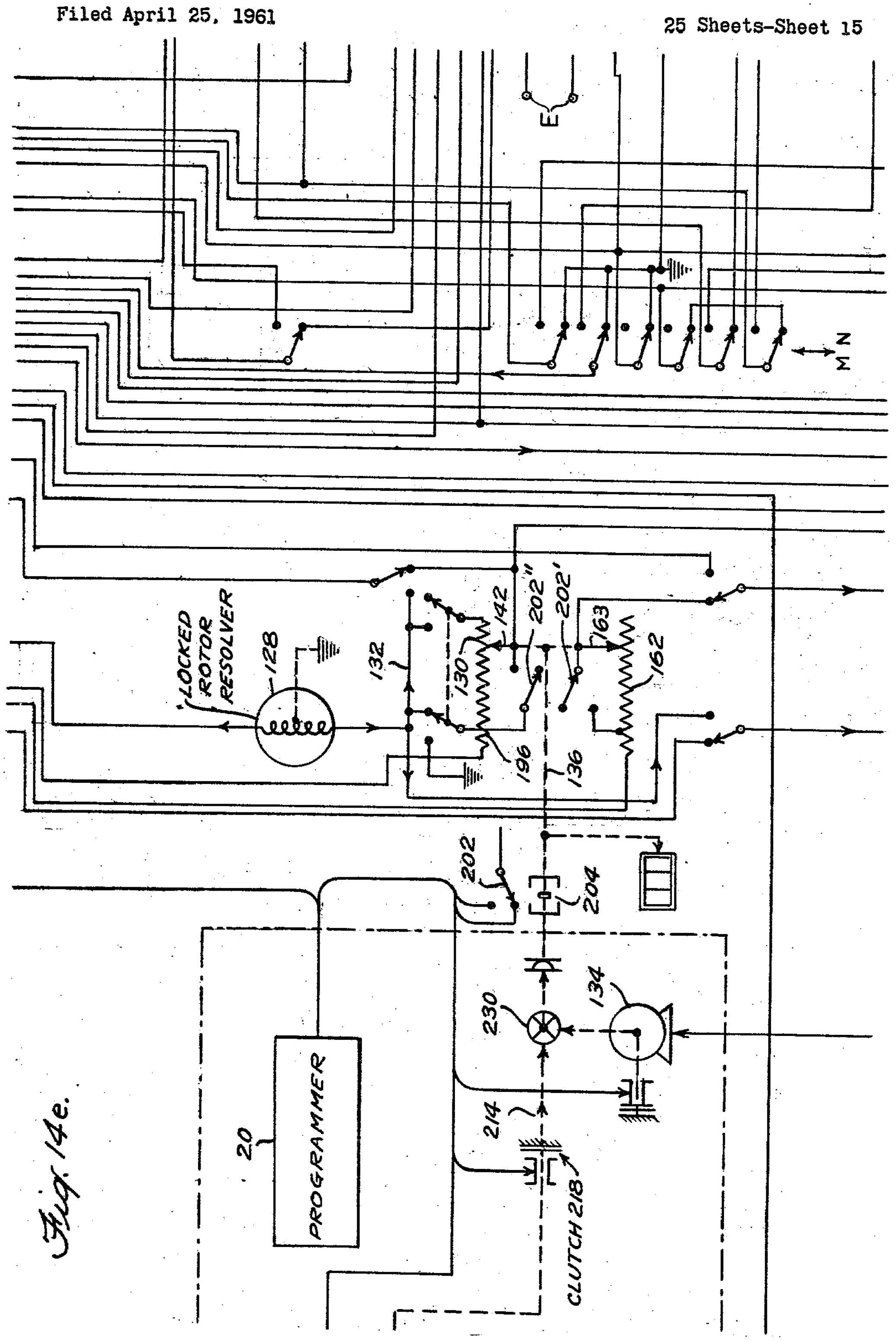
Figure 14F:
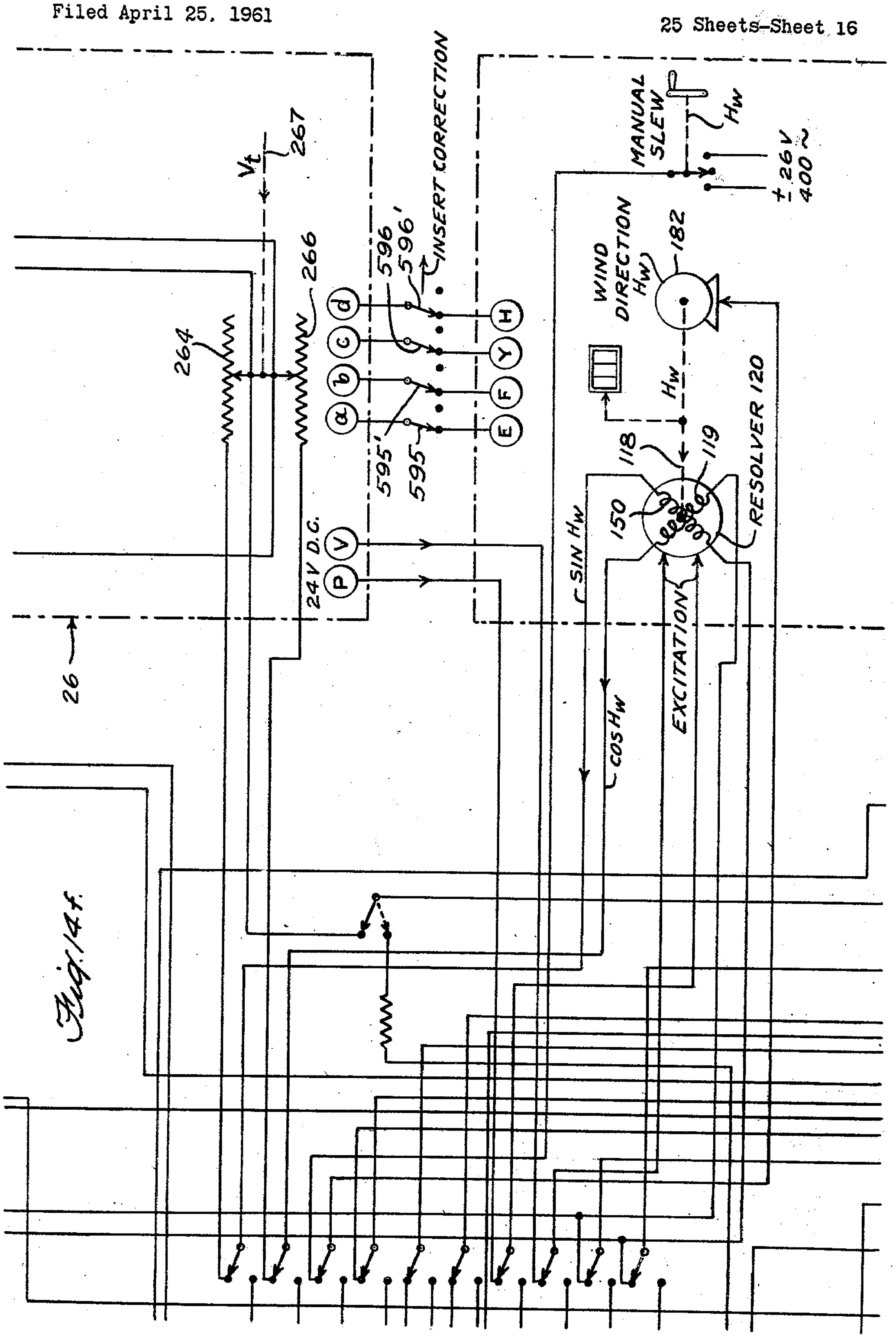
Figure 14G:
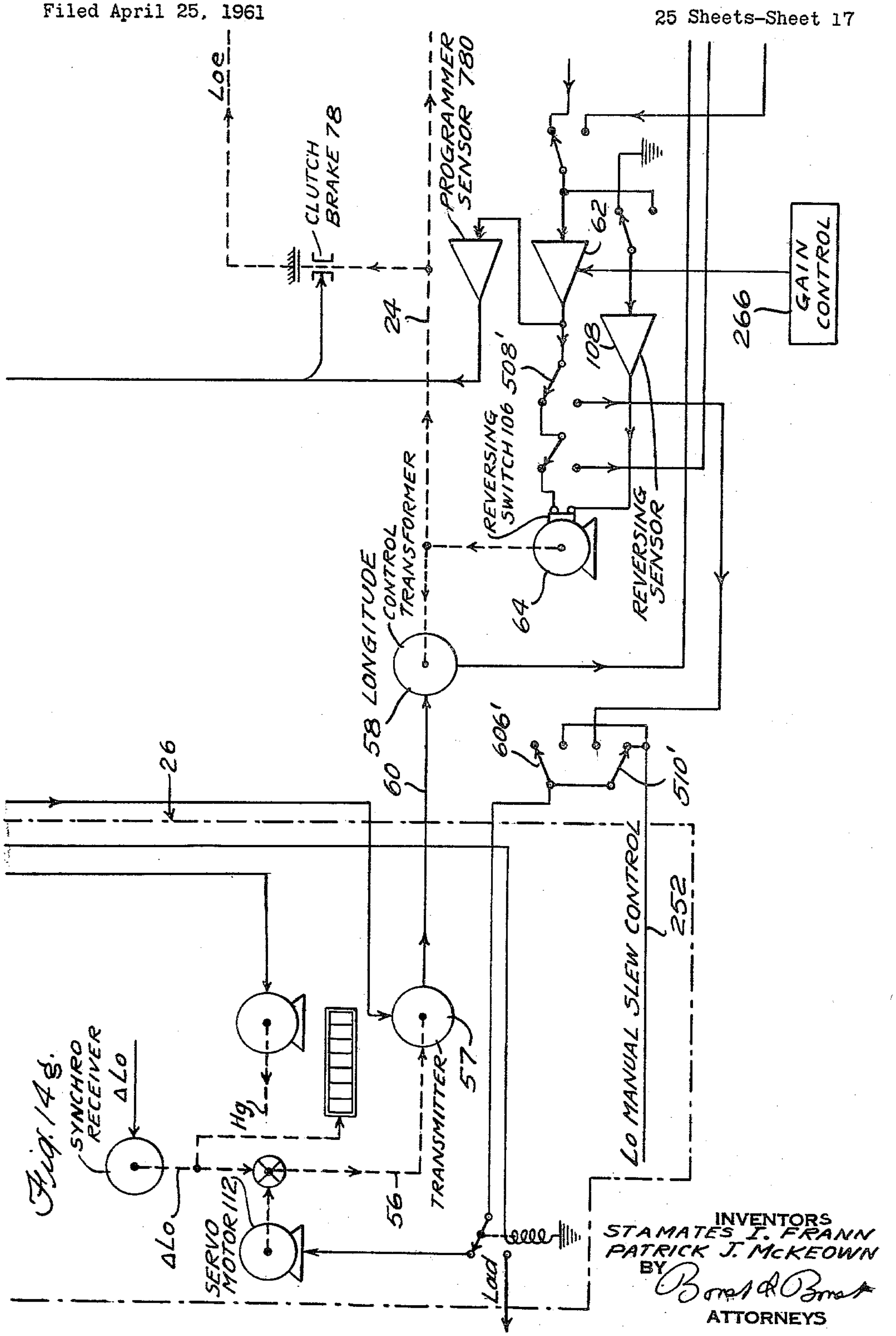
Figure 14H:
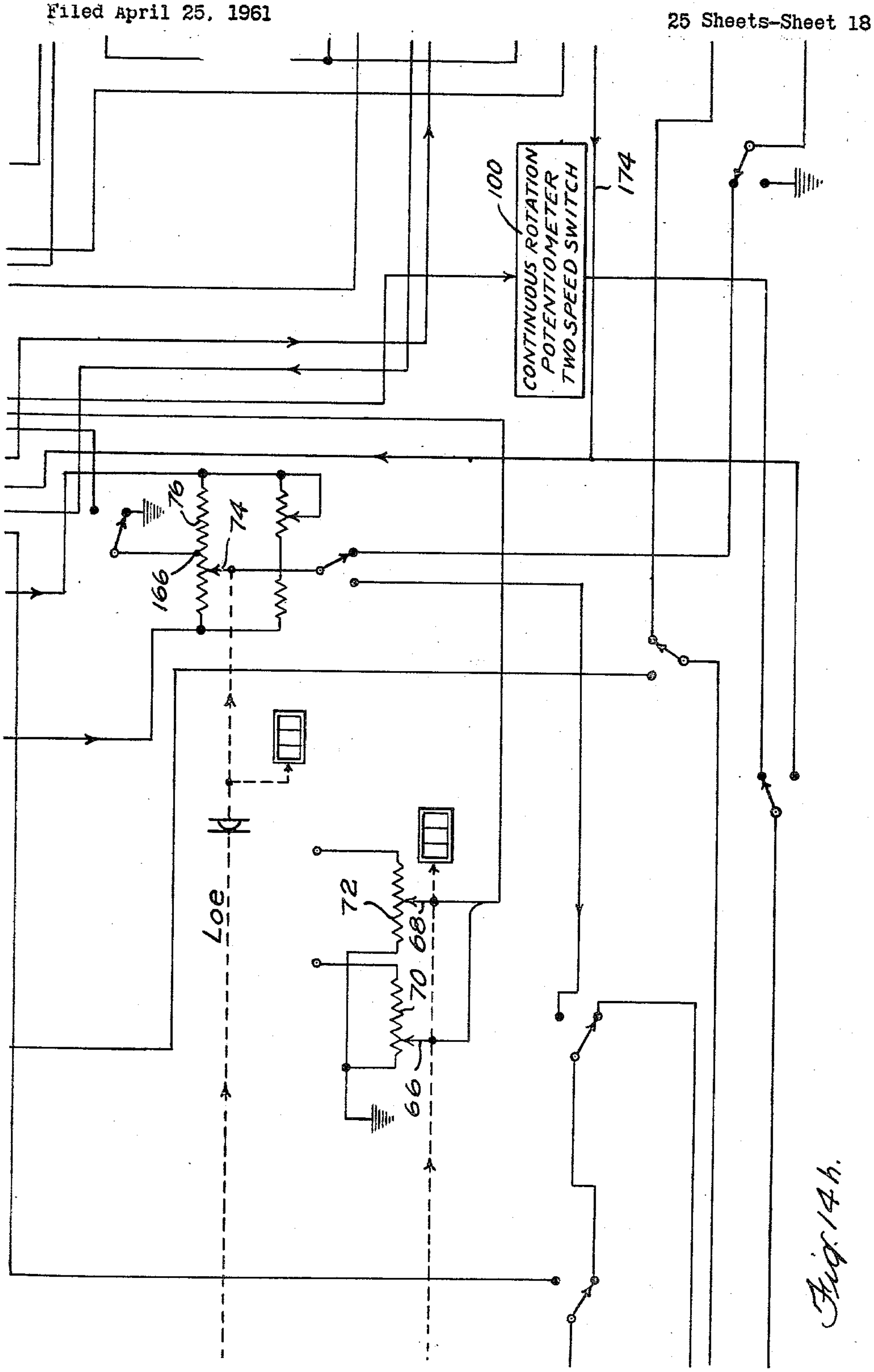
Figure 14I:
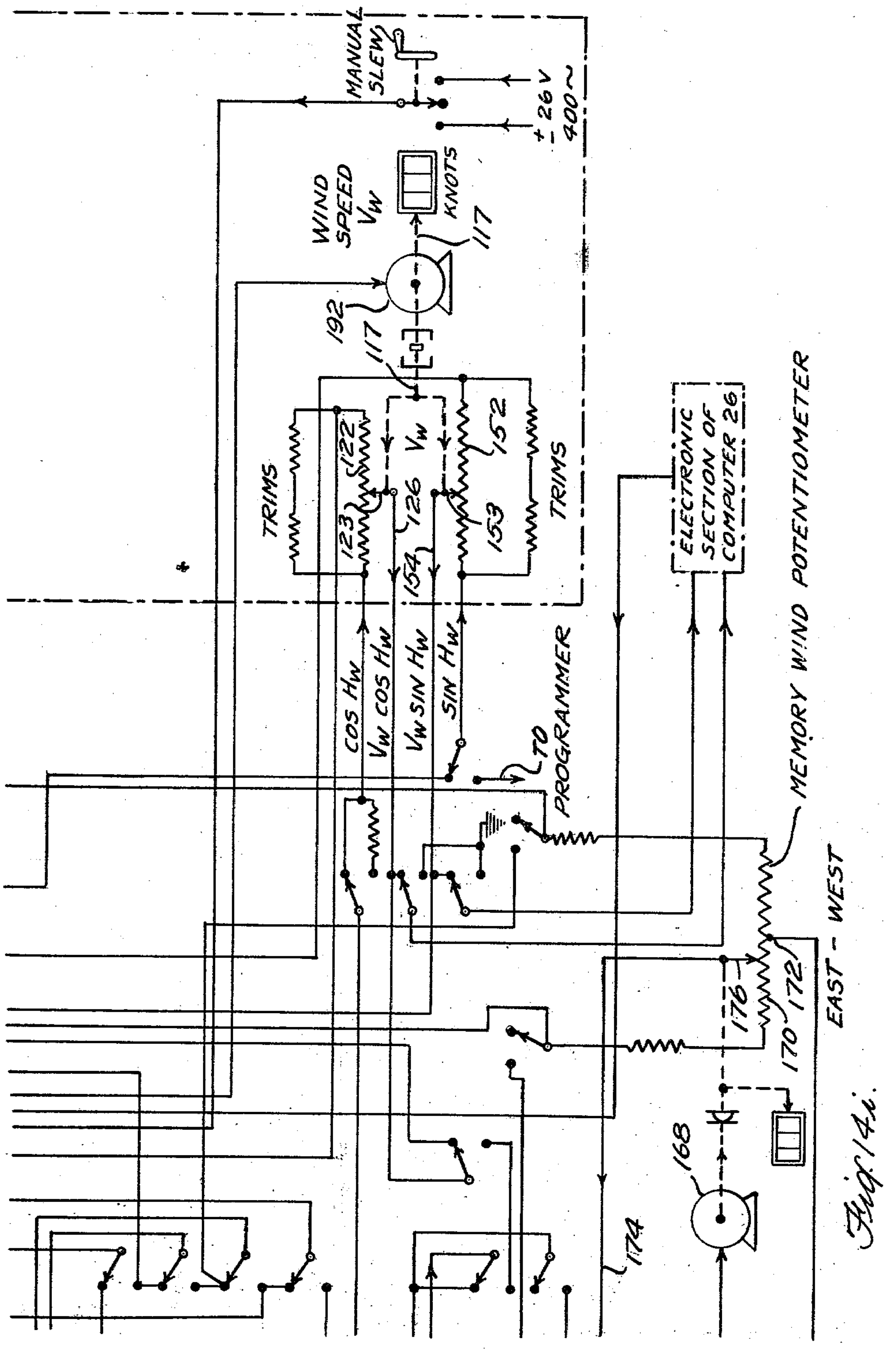
Figure 15A:
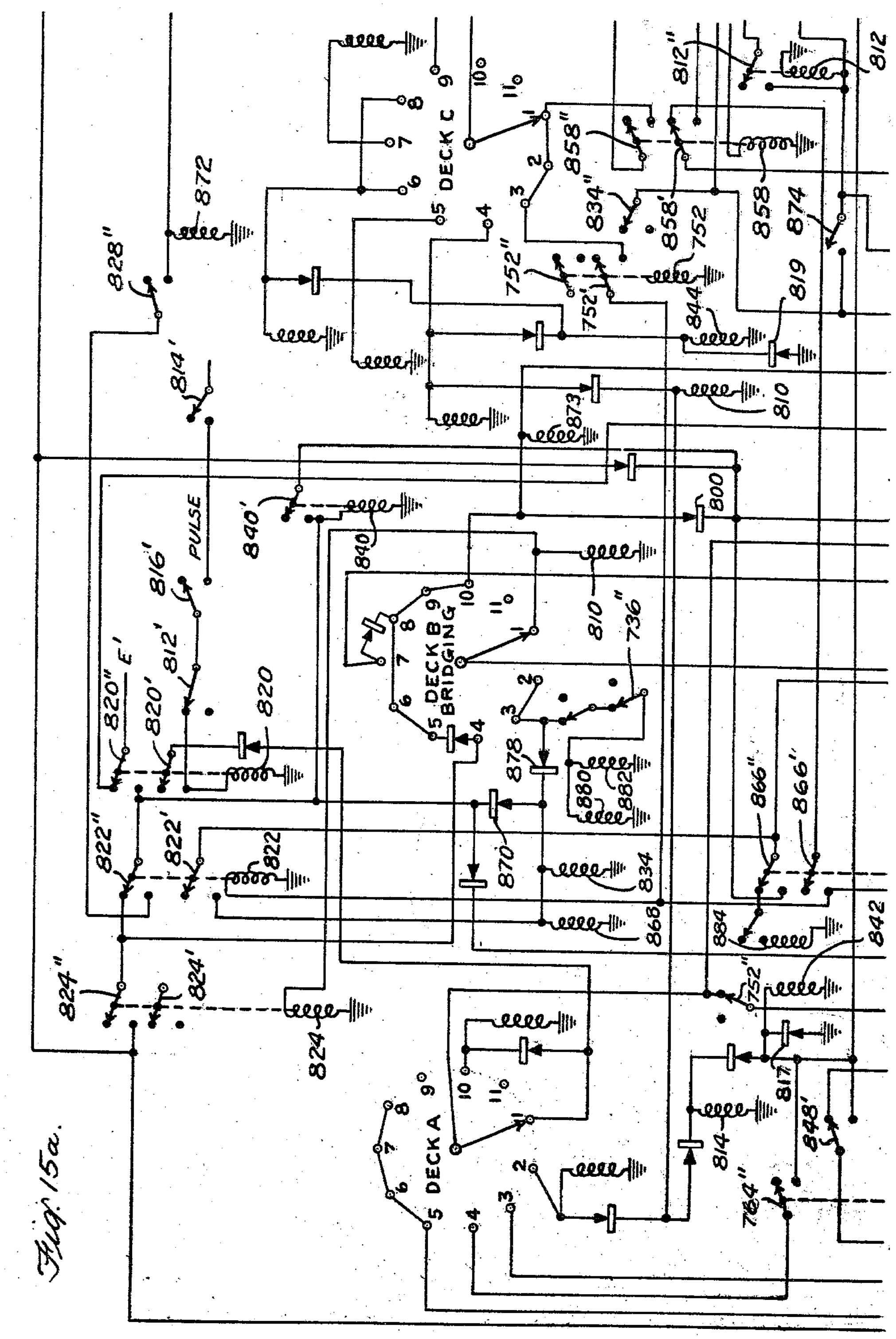
Figure 15B:
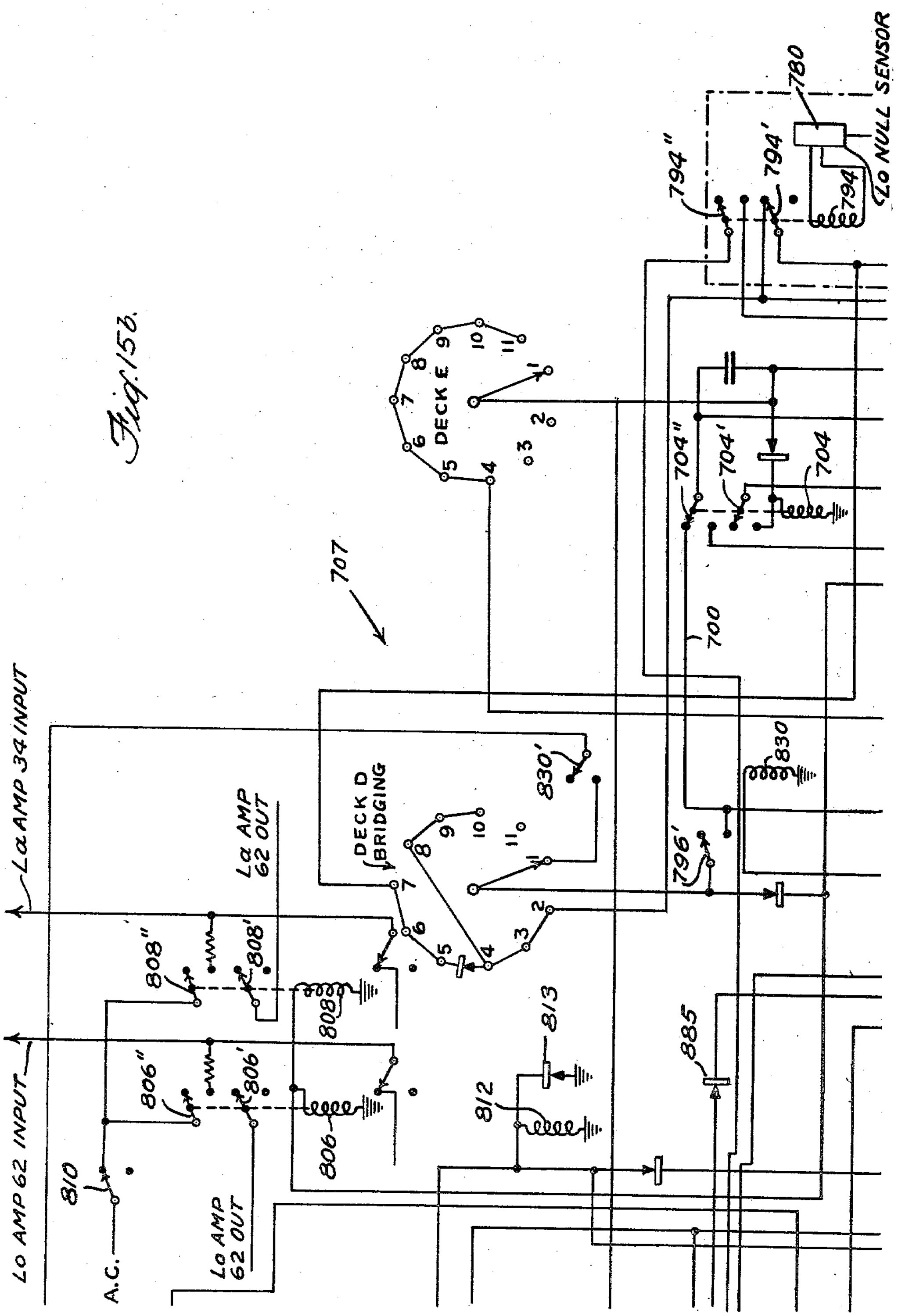
Figure 15C:
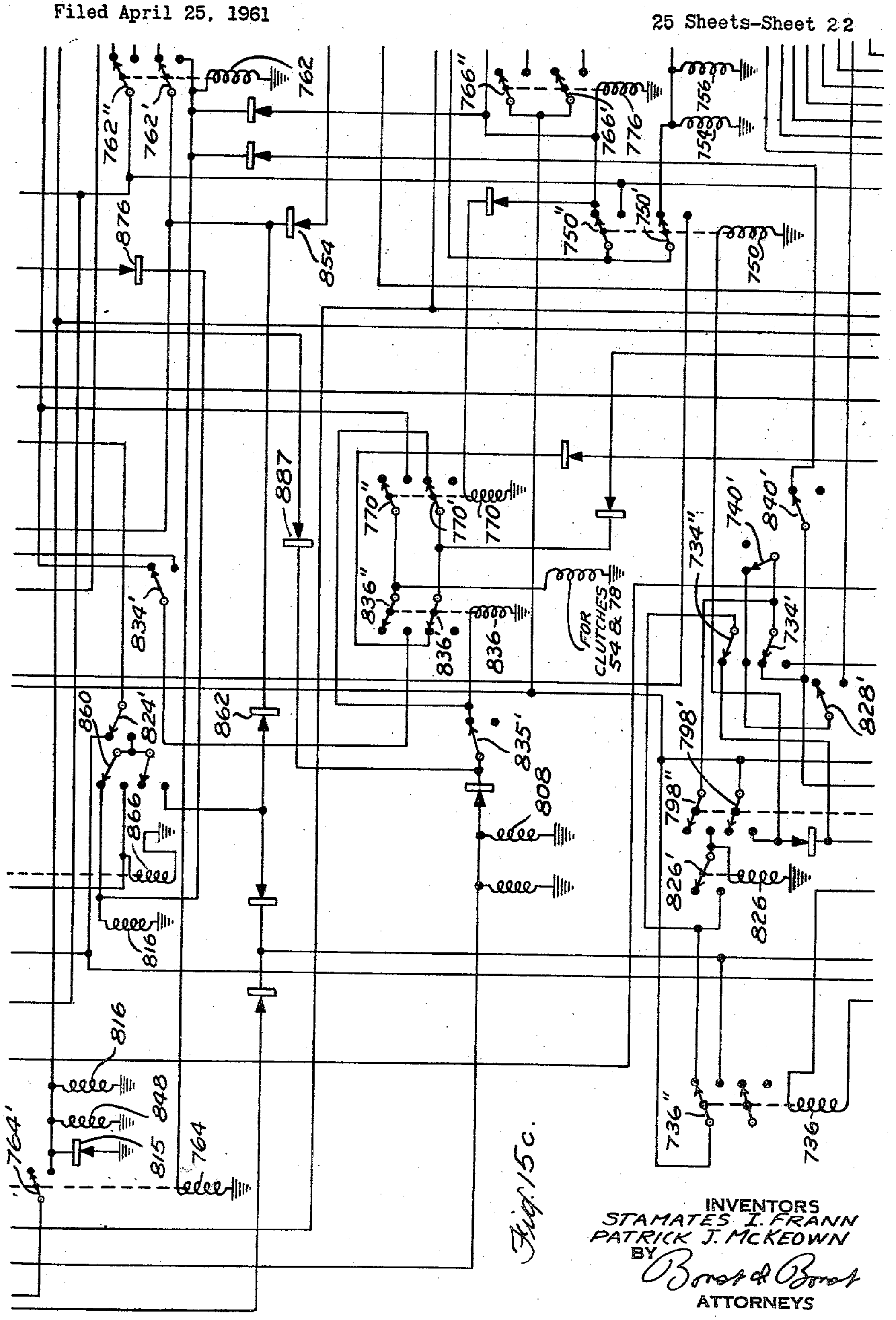
Figure 15D:
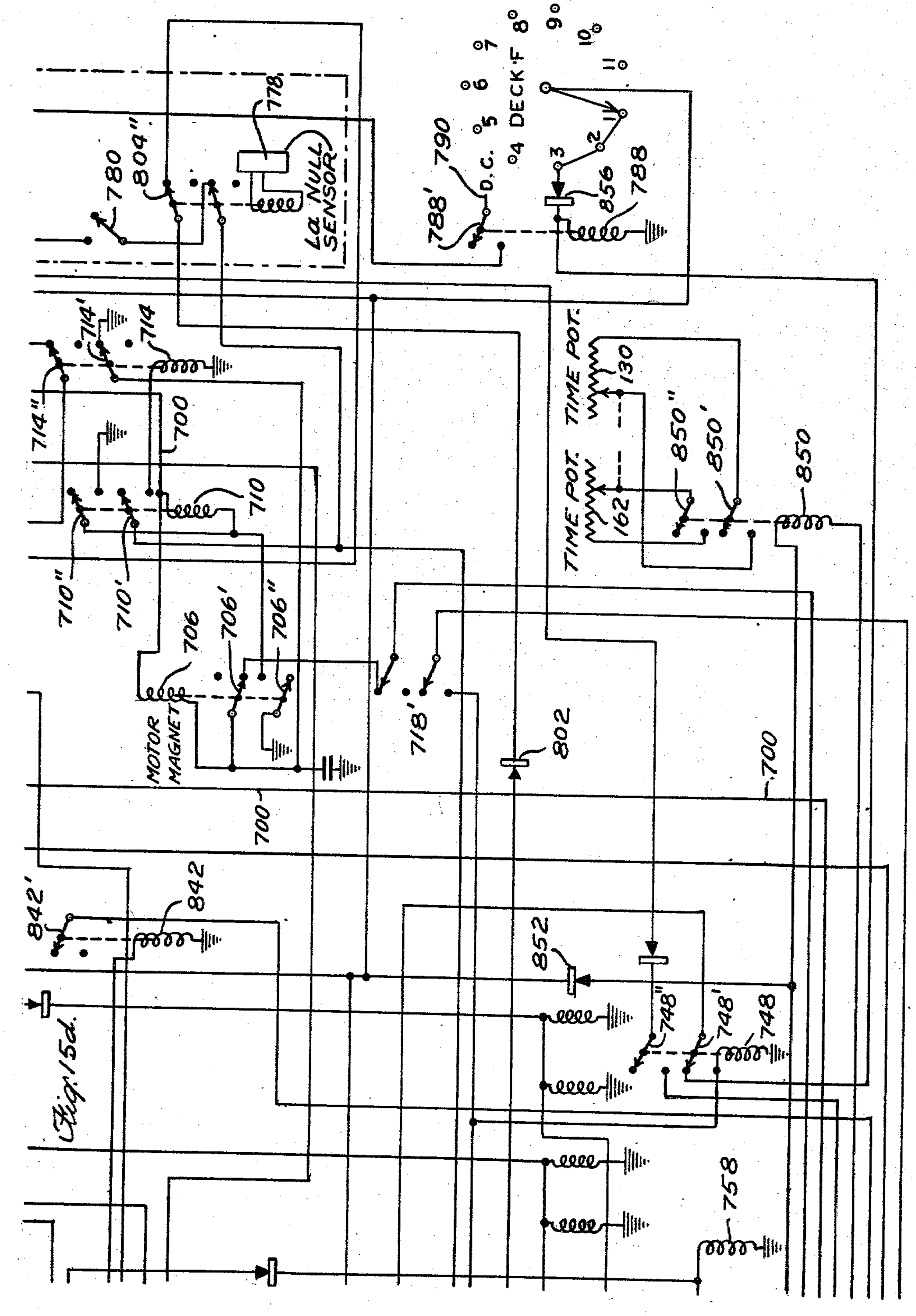
Figure 15E:
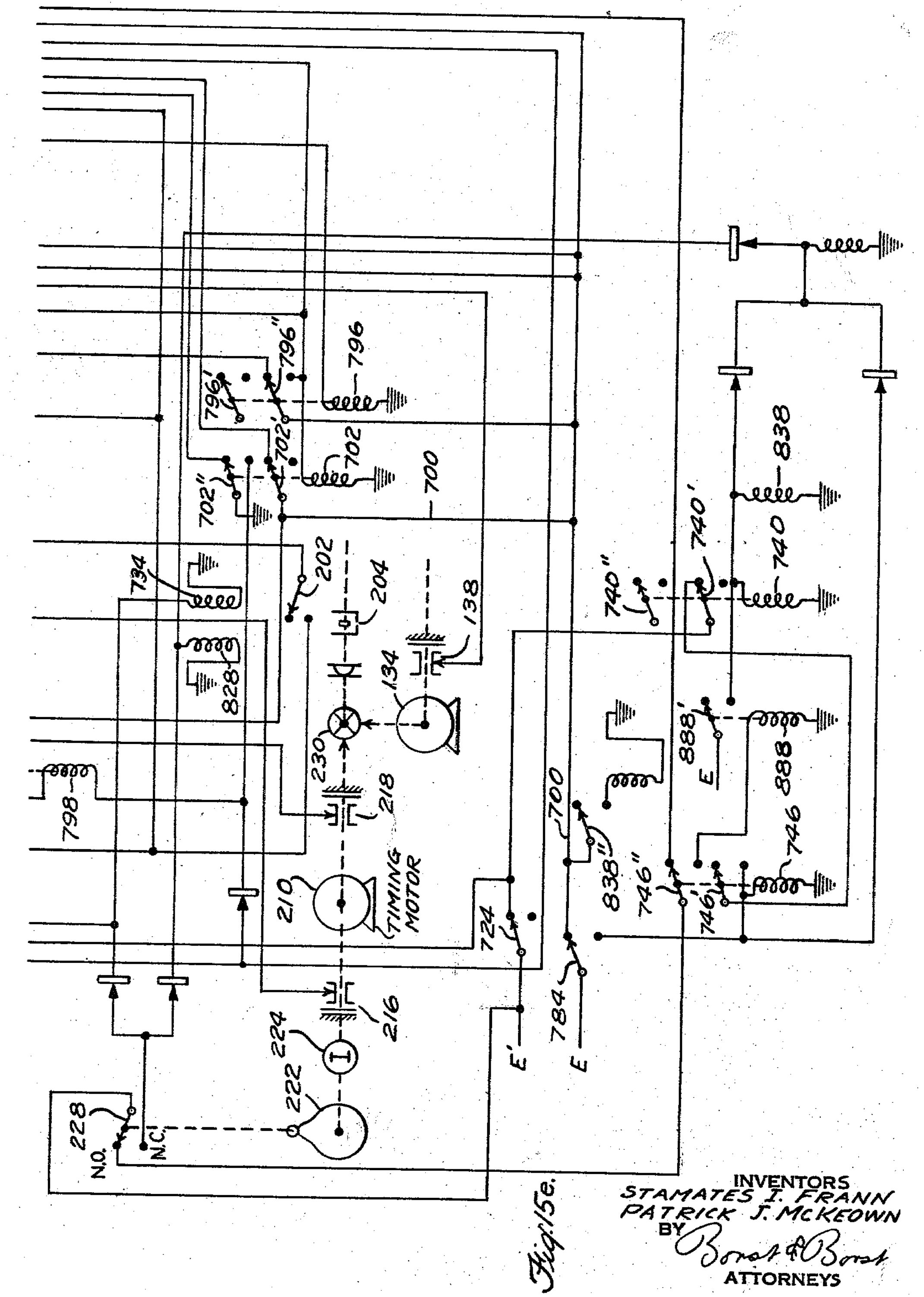

As shown in FIGS. 12 and 13 when programmer 20 is indexed to step IX, each of the error potentiometers 52 (Lae) and 76 (Loe) is reset through the coaction of its own servo motors, 36 and 64, respectively, and resolver 128.

Figure 11:
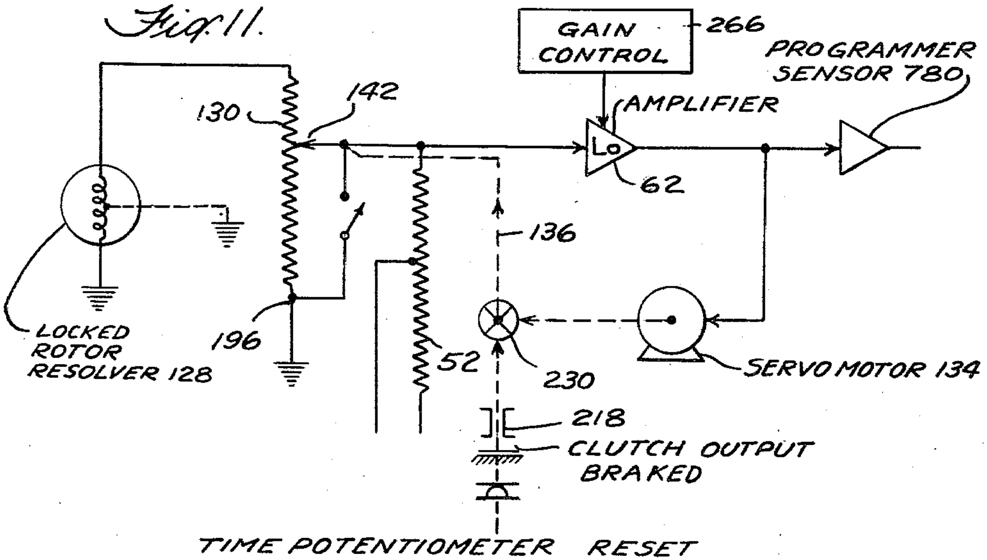
FIG. 11 is a schematic diagram of a portion of the system components operating to reset the time potentiometers shown in FIGS. 7 and 8.

The center tap 140 and 166 of each potentiometer is grounded and the voltage on wiper 50 of 52 is fed (FIG. 12) thru the La servo amplifier 34 and motor 36 while the voltage on wiper 74 is fed (FIG. 13) through the Lo amplifier 62 and motor 64. Accordingly the error potentiometer wipers 50 and 74 are driven to the center positions in an operation which is similar to reset of time potentiometers 130 and 162 as shown in FIG. 11.

The present latitude and longitude position lines 22 and 24 are unavoidably driven from the correct position in such step IX. This is corrected in the next step X by returning the computer to its normal mode (see FIGS. 1 and 2). The present position lines 22 and 24 are then aligned with the output of the dead reckoning computer 26 as explained in Section (A) Normal Operation.

*(J) No fix received within allotted time*

In the special situation where no "computation fix" is received in the allotted time, which has been assumed to be between 10 and 30 minutes, the time line 136 in FIGS. 7, 8 and 14 reaches 30 minutes and a switch 202 (FIG. 14) on the limit stop 204 is operated. This causes the computer 26 to skip immediately from programmer step I to step IV or "Memory wind." Also, the time potentiometers 130, 162 are short circuited by switches 202′ and 202″ ganged to switch 202, causing wind to be computed on the basis of a 10 minute time interval. The remainder of the step IV cycle is like a normal wind computation.

Whatever position error has been stored in potentiometers 52 and 76 will be divided by 10 minutes (instead of 30) and added algebraically to the wind already in the navigation computer. If no position error exists in 52 and 76 the circuit from wiper 123 of 122 to center tap 140 of 52 to wiper 50 of 52 will be continuous, bypassing the north-south error wind loop. The corrector will subsequently pass through the succeeding steps quickly, making no corrections to the setting of resolver 120 or potentiometers 122 and 152.

*(K) Time circuit*

A tuning fork oscillator 207 (FIG. 14) in the navigation computer 26 provides a source of precision frequency to the corrector. This frequency is power amplified by 209 in the corrector and used to drive the synchronous timing motor 210 (FIG. 14). This motor drives two separate gear lines 212 and 214 through individual clutches 216 and 218. Shaft 220 of motor 210 is constantly running whenever the corrector is energized. However, shaft 220 is either disconnected from both gear lines 212 and 214 or selectively connected to one or the other. When no fixes have been received, both clutches 216 and 218 are open and the 10 minute timing cam 222 coupled to gearing line 212, as well as potentiometers 162 and 130 driven by gearing line 214 are locked to ground to prevent rotation of these components under vibration. When the "first" pulse is received clutch 216 closes and the 10 minute timer cam is started rotating through an intermittent drive 224 which gives a dual value to the cam's shaft 226. Intermediate drive 224 rotates the cam 222 periodically until the cam has rotated 360° in 10 minutes. During each periodic rotation, cam 222 is geared directly to timing motor 210 giving a positive motion to cam 222 whereby a switch 228 is actuated. After each periodic rotation of the cam 222, the intermediate drive 224 acts as a step-down gear ratio giving the overall gear value of 10 minutes equals 360° on the cam.

When clutch 216 is first closed, intermediate drive 224 moves the ten minute cam 222 to actuate switch 228 to its normally closed position (N.C.). This signals the programmer 20 that the 10 minute timing period is underway.

During this interval the programmer 20 will permit only position fixes and position error storage but will not permit a wind computation. When 10 minutes has elapsed the 10 minute timer cam 222 again actuates switch 228 to its normally open (N.O.) position. The programmer 20 promptly deenergizes clutch 216, topping further rotation of the cam 222 and holding 228 in the normally open (N.O.) position. Thus line 212, 226 is locked to ground through 216. The programmer 20 simultaneously energizes clutch 218, unlocking line 214 and connecting potentiometers 130, 162 to the timing motor 210. Wipers 142 and 163 of potentiometers 130, 162 then begin to move away from their 10 minute end and will continue to the 30 minute end unless a fix arrives between 10 and 30 minutes. If no fix is received the condition of Section (J) exists and its corresponding description of operation applies. After all computation steps have been completed, the programmer 20 will deenergize clutch 218 and the condition described at the start of this section will be reestablished where both clutches 216, 218 are deenergized. This is not the common occurrence.

Normally a fix will be received between 10 and 30 minutes. Immediately upon receipt of the pulse signalling this fix from radio receiver 80, the programmer 20 deenergizes clutch 218 and energizes clutch 216. Clutch 216 begins to rotate the 10 minute timer cam 222 for the next wind computation period. Deenergization of clutch 218 locks line 214 and potentiometers 130, 162 at the position it held at the moment the fix was received. The wiper positions 142 and 163 of 130 and 162, respectively, are therefore a measure of the time elapsed since the last wind computation and are so used in the error wind computation described in foregoing sections. After use in the computation, potentiometers 130 and 162 are reset to the 10 minute point as described in Section (H). Element 134 is a combination brake motor so that its gear line to a differential 230 is locked except during the reset.

With the potentiometers 130 and 162 at their 10 minute point and the time cam 22 running, the cycle begins all over again.

MISCELLANEOUS SWITCHING

Referring to the schematic diagram of the system as shown in FIG. 14, a latitude and longitude manual slew control signal on leads 250 and 252 in a Section I of computer 26 passes through contact 510′ and 510″ respectively, and then to either the present position or destination slew motors. When a fix is received contact 510′ and 510″ transfers control of the slew motors to the corrector by way of a contact 508′ or 508″. Contact 606″ in parallel with 510″ and 606′ in parallel with 510′ will be described later.

A switch S2 (see also FIG. 15) normally controls the insert of fixes by throwing change of position into a storage mechanism. Contact 868′ (described later in reference to FIG. 15) in the corrector does this automatically by providing a D.C. voltage on lead 255 to a lead 256 going to where the storage mechanism is located. S2 has the following positions; off, standby, run, present position and P.P. reset. When the corrector is operating, the operator leaves this switch in the "run" position.

A single display of position in the computer 26 can show either present position (P.P.) or destination latitude and longitude. If the operator were to have this control in the destination position, switch 510″ and 510′ would transfer control of the destination motors to the corrector. This is not wanted, therefore contact 868″ is used to interrupt the D.C. voltage on lead 258 from S3, automatically throwing the control over to the present position sections.

A coil 606 can only be energized when contact 868″ is "down." This is maintained during all steps of the operation except receiving and inserting the fix (steps II and III). Contacts 510′ and 510″ are held energized throughout all steps but 508′ and 508″ continue the circuit only in step III. This means that the operator cannot slew the present position lines when the autocorrector is in operation. However, he can, after steps II and III put the switch S3 in the destination position, thus closing 606″ and 606′, permitting him to change the destination if he so desires. However, he cannot change present position without operating the appropriate controls on the corrector.

Contacts 536′ and 537′ open up the input control leads to motors 259 and 260. This prevents the rate circuits of which these motors are a part from moving away from their set position when other parts of the circuitry are interrupted for insertion of the new wind.

FIG. 17 shows the original arrangement of $H_t$, $H_w$, $V_t$, $V_w$ in the computer 26. Resolver 262 is not used in the corrector and does not show on any of FIGS. 1 to 13. Potentiometers 122 and 152 are ganged and adjusted by $V_w$. The other elements are switched as needed.

Switches 595, 595', 596 and 596' described later in reference to the programmer 20 are used to drop a flag across the position counters in the computer 26 to indicate that the position is being corrected. This is necessary since there is a second flag that could read "destination" while the corrector is automatically reading out present position. Connections to this "destination" flag are not accessible.

Trim resistors, as shown in FIG. 14, are placed in the circuit to adjust the scale factors throughout the system.

The two servo amplifiers 34 and 62 each have an input called "gain control" and designated 194 and 266, respectively. This is an adjustment of the servo loop gain designed to compensate for the different conditions under which the servo amplifier is used. The actual adjustment of gain is switched into the circuit of the Programmer 20.

PROGRAMMER

The programmer 20 in FIG. 4 will now be described with reference to FIG. 15 in each of its several modes of operation.

(*A*) *Start*

The initial energization of the autocorrector can find the programmer at any random place in its computation. It is necessary to initiate a checking and clearing process, first before the autocorrector is ready for normal operation. The programmer automatically initiates this checking and clearing process by stepping to step VIII, time pot reset, and then continuing through steps IX and X, after which the instrument is ready for the insertion of new data.

After the power is turned on, a circuit 700 is completed from voltage E through contact 702' N.C. (normally closed) contact 704" N.C. (normally closed) and motor magnet 706 of a stepping switch 707 to ground. Energized motor magnet 706 closes interrupter contacts 706" which allows E to excite and hold relay 710. Energized relay 710 closes contact 710' which then energizes a relay 714. Relay 714 when energized breaks the motor magnet 706 connection to ground through contact 714' and thus stepping the stepping switch 707 to Step I. Simultaneously the voltage E is applied to motor magnet 706 and if the stepping switch 707 is off Step VIII, the off-normal contact 718 is closed. An electrical path to ground then exists through contacts 702" N.C. (normally closed). The electrical path through contact 702' N.C. (normally closed), contact 704" N.C. (normally closed), motor magnet 706, an interrupter 706', off-normal contact 718 and contact 702" (normally closed) constitute a buzzer and, therefore, the stepping switch 707 goes to Step VIII where the off-normal contact 718 breaks the path.

Voltage E' is conducted through a long cycle switch 724 and the switch 228 N.C. (FIG. 14), provided the timing cam 222 (FIG. 14) is off its 10 minute point, and from there to a coil 734. Also voltage E goes through a contact 736" N.C. (normally closed), a contact 734" N.O. (normally open), a contact 740' N.C. (normally closed), a contact 734' N.O. (normally open) to the braked clutch 216 (see FIG. 14). This causes the cam 728 to be driven until the 10 minutes point is reached.

When the cam 222 is reset, and the stepping switch 707 is on Step VIII, voltage E' is conducted through the long cycle switch 724, the switch 228 (FIG. 14) N.O. (normally open), a contact 746" and an off-normal contact 718' to a coil 748; through a contact 750" N.C. (normally closed) and a contact 750' N.C. (normally closed) to a coil 754, a coil 756, a coil 758, a coil 762, a coil 764, a coil 766, and to a coil 770. Now the flip-flop is set so that the clutch 54 (FIG. 3) or 78 (FIG. 4) to the error storage pots 52 (FIG. 3) and 76 (FIG. 4) is not pulled in. Voltage E can now go through contacts 766" (normally open) and 766' (normally open) to pull in the proper relay to reset the time pots 130 (FIG. 11) and 162 through the longitude servo amplifier 62 and to keep the latitude servo amplifier 34 at null. If the time pots 130, 162 were at the 30 minutes point, the 30 minute switch 204 (FIG. 14) would also be reset. The closing of a contact 748" by coil 748 permits voltage E to go from La and Lo null sensor 778 and 780 to coil 702 at null. Until coil 748 was excited, voltage E went through a short cycle switch 784 and a contact 748' N.C. (normally closed) to a coil 788. A D.C. voltage was picked up from a line 790 and conducted through a contact 788' N.O. (normally open) to the longitude sensor 780 holding down a longitude null sensor relay 794. It takes approximately 1 second for relay 794 to release after its exciting voltage is removed. This allows sufficient time for the null sensors 778, 780 to come off null in case the time pots 130, 162 require resetting. The pulling down of the relays 762 and 764 sets up a long cycle computation so that we can complete the required clearing in the start mode.

When the time pots 130, 162 are reset, voltage E is conducted through the latitude 778 and longitude 780 null sensors and contact 748" N.O. (normally open) to coil 702. Simultaneously voltage E is conducted through the sensors 778, 780 and a deck D pin 8 of the stepping switch to a contact 796'.

When the timer cam 222 reaches 10 minutes, coil 734 was released. Now E is conducted through contact 734' N.C., a coil 798 and contact 702" N.O. to ground. Energized coil 798 allows voltage E to go through a contact 798' N.O. to a coil 750. Now voltage E goes through contact 748' N.O., contact 750" N.O. and 750' N.O., to deck B of the stepping switch 707, through 752" N.C. to deck A of the stepping switch 707, through 762" N.O. to deck C of the stepping switch. Simultaneously with applying power to the decks, E goes through 750" N.O. to a coil 796. Until coil 706 is pulled down, E goes through a contact 796" N.C., a diode 800, and a contact 762' N.O. to coil 762, holding it down until contact 750" is pulled in. When contact 750" is pulled in relay 762 is latched through deck B and diode 800. When relay 796 is pulled in, E goes through the short cycle switch 784 and 796" N.O., latching 702 to prevent homing when the stepping switch is off step, and supplying power to the flip-flop so that voltage can be removed from 750" N.C. It is to be noted that since 750 is excited before 796, voltage must be maintained on coil 702 in order to prevent possible reset of the flip-flop. It might appear here that a problem exists, because E can go through 750" N.C., a diode 802, a contact 804" N.C. to a coil 806 and a coil 808, since when 806 and 808 are excited the null sensors 778 and 780 are pulled off null. However, a problem really does not exist, since at least $\frac{1}{10}$ of a second is required for the null sensors to come off null. Under these conditions sufficient time exists for continuity of voltage feeding the arm of relay 770. Therefore, the flip-flop will remain in the position in which it was set. E now goes through 796' N.O. to the stepping network; that is 704" N.C. the motor magnet 706 and 714' N.C. to ground. Then E goes through coil 710, and the interrupter to ground. Then E goes through 710' N.O. to coil 714, breaking the path from the motor magnet to ground, and releasing the stepping switch 707 to step IX.

When the null sensor comes off null, 710 is released for receiving a new null. Relay 806, 808 and a relay 810 constitute a circuit which prevents the programmer 20 from discontinuing its operation when, having gone from one step to the next, the second step is already at null. In addition these relays constitute a circuit which eliminates the need for dry circuit relays. This circuit will be described in greater detail in a later section. Even if relays 806 and 808 should succeed in pulling the null sensors 778 and 780 off null before the stepping switch is able to be sent to step IX, no harm comes of this, for the null sensors will again come to a null and the stepping switch will then be sent to step IX.

In step IX, relays in group 812 are pulled in. At null, E goes through the null sensors 778 and 780, deck D and contact 796′ to the stepping network, and then the stepping switch goes to step X. It is to be noted that since deck D is bridging, 762 remains latched and the long cycle is maintained. Also since deck D is bridging, the stepping switch cannot overstep because there is no discontinuity in voltage in going from one step to the next Diode 813 which is across the relays in groups 812 is used for arc suppression when we break the loads. The same can be said for diodes 815, 817 and 819. When a null is reached on step X, the stepping switch is sent to step XI. On step XI, relay 762 is unlatched and therefore E can go through 762″ N.O. and deck E pin 11 to coil 704. E then goes through 714″ N.C., 704″ N.O. to the motor magnet 706. The stepping network functions as before, and as a result step XI is skipped and the stepping switch goes to step I.

Having reset the time cam 222, the time pots 130, 162 and the error storage pots 52, 76, all clearing steps are completed, and the autocorrector is now ready to receive fix information. The start mode is now completed.

*(B) Automatic fixes—Short cycle*

When the radio receiver 80 has new position data, a D.C. signal is sent through 814′ N.O., 816′ N.O., and 812′ N.C. to coil 820. Relay 820 is latched by deck A pin 1 until we are finished with step I. Voltage E′ goes through contacts 820″ N.O., 822″ N.C. and 824″ N.O. to coil 734. Then E goes through 734″ N.O., 740′ N.C., 798″ N.O. to a relay 826, latching it; then through 740′ N.C., 734′ N.O. to clutch 216 (see FIG. 14) to start the timer cam 222. Once cam 222 has moved off zero, E′ then goes through switch 228 N.C. to coil 734 and a coil 828. Then E goes through 734″ N.O. and 828′ N.O. to a coil 830. Now E′ goes through 820″ N.O., 822″ N.C., 824″ N.O., 830′ N.O., deck D, 796″ N.O. and 704″ N.C. to the stepping network actuating the stepping switch to step II. It is to be noted that the pulse which appears on deck B does not cause any problem. Also relay contacts 816′, 812′ and 820″ N.C. constitute a circuit which prevents the simultaneous occurrence of automatic and manual fixes.

In step II, relays 820, 814 and 810 are pulled in. Although relay 834 is pulled in, clutches 54 (FIG. 1) and 78 (FIG. 2) are not, because the flip-flop is in the wrong position. Once the programmer 20 comes off step I, automatic fixes will not be accepted by the system.

When a null is reached, the stepper switch 707 goes to step III. Relays 832 and 808 are pulled in, and the position of the flip-flop is changed. Coil 836 is excited through 835 N.C., enabling clutches 54 and 78 to be pulled in on step II of succeeding cycles. The only difference between the first and the succeeding cycles is the ability to excite these clutches on step II. Although the clutches are also held excited in step III, this creates no problem because the clutches are driven only in step II.

At null, stepper switch 707 goes to step IV. However, E goes through 762″ and deck E to relay 704 and to the stepping network, causing the stepping switch to operate as if self-interrupted until step I is reached. No groups are pulled in during this stepping since relay 764 is open and no voltage is applied to the wiper of deck C.

*(C) Long cycle*

When the timer cam 222 has run for 10 minutes, 228 is operated and 734″ and contact 828′ are released. E goes through 736″ N.C., 826′ N.O., 798″ N.O., 734′ N.C. and 840′ N.C. to coil 762 setting up a long cycle computation, and starting the time pots 130, 162 running through clutch 218. If the apparatus were in the middle of a cycle when 10 minutes elapsed, 830′ would block E from reaching coil 762.

Everything is maintained until step IV is reached. Then because relays 762 and 764 are excited we do not step around, but instead pull in groups 842, 844, 814 and 810.

At null we go to step V and pull in groups 816, 842 and 814. Now to step to steps VI, VII and VIII, a null has to be reached only on the latitude null sensor 778 because of the line from the latitude null sensor relay to deck D pins 5, 6 and 7. In steps V, VI, VII and VIII the latitude servo line 22 is used for the computation of wind, while the longitude servo line 24 is used for reset of the time pots 130, 162. Since reset of the time pots may take considerably longer than any of the steps in the wind computation, completion of time pot reset is not required in order to step from V to VI, VII and VIII. However, before proceeding to step IX, nulls are required on both the latitude and longitude servo lines 22 and 24.

In step VI, groups 816, 842, 844 and 814 are excited. In step VII, groups 816, 842 and 814 are excited. In step VIII groups 816, 842, 844 and 814 are excited.

When nulls are reached on both the latitude and longitude lines 22 and 24, the stepping switch is stepped to step IX. Steps IX, X and XI are the same as in the start mode.

*(D) 30 Minutes mode (No fix received in 30 minutes)*

If 20 minutes after starting long cycle and no further fixes are received, switch 202 (FIG. 14) is operated. E goes through a contact 848′ and 202 to coil 736 and through 736 and 702″ N.O. to ground.

Operation of relay 736 causes the release of 826, unclutching 218. Relay 734 is excited to prevent E from going through 798′ N.O. and 734″ N.C. to 826′ N.O., thereby preventing the release of relay 826.

E also goes through 202 to coils 850 and 770. Operation of relay 850 causes the time pots 130, 162 to be shorted so that wind will be computed on the basis of 10 minutes. Operation of relay 770 causes reset of the flip-flop so that clutches 54 and 78 will not be operated on step II of the next cycle. E also goes through diodes 852 and 854 to 762′ arm keeping relay 762 latched.

E goes through diode 852 to deck F wiper, through pins 1, 2 and 3 of deck F and through diode 856 to coil 788. The D.C. voltage on line 790 is fed through 788′ N.O. to the longitude null sensor 780, exciting relay 794. E then goes through diode 852 and 794″ N.O. to a coil 850. E then goes through 762′ N.O., deck C pins 1, 2 and 3 and 858′ N.O. to relay 704, causing stepping to step II. The same is repeated until step IV is reached.

When the stepping switch 707 reaches step IV, a wind is computed just as in the long cycle mode. However, the time base is 10 minutes, since the two time pots 130, 162 are shorted out by the contacts of relay 850.

At null the stepping switch 707 goes to step V. The 30 minute switch is released as a result of the excitation of relay 848. The time pots 130, 162 are now unshorted and can be reset.

The remainder of this computation is similar to that of a long cycle. Note that relay 826 was released and 770 excited so that the next fix will be like a first fix.

*(E) Manual fixes*

In step I it is possible for the operator to insert the manual fix. When the manual fix switch 860 is pushed, E′ goes through 820′ N.C., 824′ N.O. and the manual fix switch 860 to coil 734, starting the time line just like an automatic fix. E' also goes through the manual fix switch 860, diode 862, diode 864 to 762' arm holding relay 762 latched, if required.

Simultaneously E' goes through the manual fix switch 860 to a coil 866, latching it to relay 822. Then E goes through 822' N.O. to 868 and 834 and through diode 870, 822'' N.O. and 828'' N.O. to the standby flag 872, relay 812, latching it, a compute switch 874, and then through diode 876 to relay 816.

When the standby flag comes down, the manual fix switch 860 can be released. Note that a diode 878 and relay contact 816'' prevent relays 880 and 882 from being excited. This prevents the counters from being covered. Excitation of relay 866 releases group 884 permitting the insertion of present position information. Also E goes through 866' N.O. to 762 arm holding relay 762 latched.

After inserting present position the operator pushes the compute switch 874. Operation of the circuit is similar to the 30 minutes mode. E goes through 842'' N.C., 712'' N.O., the compute switch 874 and diode 885 to the wiper of deck F. Operation is then the same as in the 30 minutes mode.

When the stepping switch 707 reaches step IV, operation is the same as for a normal short cycle or long cycle computation. When step IV is reached, a compute flag 873 is excited. At any time thereafter the operator may release the compute switch 874. The standby flag 872 will remain excited until step VII is reached. At that time 842 is excited releasing 812 and the standby flag 872.

When the compute switch 874 is pushed, E also goes through 834'' N.O. to relay 752. Contact 752'' breaks the voltage to the wiper of deck A, so that no relay groups will be pulled in during the skipping from step I to step IV. E also goes through 762' N.O., deck C pins 1, 2 and 3 and 752' N.O. to keep relay 866 latched. Although the voltage to 866 is broken when the stepping switch is between steps, 866 remains latched because the time to go from one step to the next is less than the time required for relay 866 to release.

When the compute switch 874 is pushed, E also goes through diode 887 and 838' N.C. to coil 836. This is so that the flip-flop position will be changed if a manual fix is inserted after a 30 minute mode or a manual short cycle.

(F) *Manual short cycle*

At the operators discretion he may cut out all wind computations. Pushing and releasing the short cycle switch 784 throws the apparatus into the start mode. The reason for a relay 888 is to provide time delay in case we are on step VIII and the timer cam 222 is in the proper position when we go into short cycle. That is, relay 792 should remain unexcited and holding down the longitude null sensor relay 794 for a length of time such that when the null sensor relay is released it does not come up until any need for resetting the time pots 130, 162 has had an opportunity to manifest itself.

When we reach step VIII and have reset the timer cam 222, E' goes through 746'' N.O. to coil 888.

After about five seconds E' goes through 888' N.O. to coil 740 releasing 746.

When 746 is released E' goes through switch 228, 746'' N.C., the off-normal contacts 718, 750' N.C. to 766 and then goes through the remainder of the start mode.

When 740 is excited, the connection from 734' N.O. to 734'' arm is broken. This prevents the time line from running when a fix is received.

Relay 838 breaks the line to relay 836 so that the flip-flop will not be set to the position where the position error clutches 54 and 78 can be excited.

(G) *Manual short cycle cutoff*

When the stepping switch 707 is in position I and the manual fix switch 860 has not been pushed it is possible, by pushing the long cycle switch 724, to cut out manual short cycle by releasing relays 740 and 838. This completes the description of the operation of the basic programmer 20.

(H) *Special features of programmer*

Switch arm 228 was connected to E' rather than E, because if the apparatus were in step VIII wtih 228 thrown when the apparatus started out, 748 would be pulled in immediately and not have a chance to excite the Lo null sensor relay 794.

Relays 816 and 736 are used to prevent the excitation of 880 and 882 during the stepping from step I to step IV in the 30 minutes and manual fix modes, thus preventing the flickering of the present position flags.

The location of the standby flag was selected so that it would not come down until the timer 222 had started running.

If a manual fix is inserted while the apparatus is in short cycle mode, and if both the manual fix switch 860 and the compute switch 874 are held down the stepping switch 707 will go round and round until the compute switch 874 is released. The stepping switch 707 will then go to step I. To prevent this the compute switch 874 could be made double pole. The second set of contacts should be placed between 824' N.O. and the arm of the manual fix switch 860, thus the compute switch 874 must be released before the manual fix switch 860 has an effect.

Relays 810, 806 and 808 are used to eliminate the dry circuit problem. When a null is reached, relays 806 and 808 are excited. If the stepping switch 707 is off position I, an A.C. voltage is fed through 810' N.C. and 806 and 808' N.O. to the servo amp inputs and back to the signal sources, breaking down any dry circuit relays. At the same time the servo amp outputs are disconnected by relays 806 and 808. However, the null sensors remain connected to the servo amp outputs so that now they are brought off null. This circuit acts as a low frequency buzzer and thus eliminates the problem of coming to a new step and finding a null already there.

Relays 816 and 820 are used to eliminate any ambiguities when manual and automatic fixes occur simultaneously.

SUMMARY

The operational nature of the autocorrector is sequential. Because of this, it has been possible to use many of the components in several separate circuits by proper interconnections in each step of the sequence. Reference to FIGS. 1 to 13 will establish that many of the components are used in separate and different circuit roles.

The sequential operation of the autocorrector is controlled by a section called the programmer 20. This section includes program sensors 778 and 780 to signal the end of each portion of the computation, a stepping switch 707 having sets of contacts pertaining to each step of the cycle and a group of relay contacts controlling the circuit configuration.

A sequential operation can be controlled in several ways. It would be feasible to allow a fixed interval for each operation. For a sequence of a small number of steps this would probably be the simplest controlling means, especially if each step requires a short time interval. The autocorrector as described, however, has a compartively large number of steps with a rather indeterminate interval for each step. In fact, normally the quantities of error to be dealt with will be comparatively small and each step should require a rather short interval for completion. There is, though, the capability for handling rather large mathematical quantities. In this situation each step would require a longer interval for completion. Because of this peculiarity, a fixed time interval is not felt to be desirable. Instead, the more sophisticated method is used wherein the end of each step is actually sensed by the mechanism and a signal generated to cause the device to continue on to the next step. This has the advantage of permitting the device to complete its cycle of operation as expeditiously as possible and would allow position corrections to be inserted more frequently. Accordingly, as disclosed, each program sensor is an electronic circuit that measures the voltage output of the servo amplifier being applied to the servo motor. When the servo is functioning to drive the motor a large "fundamental frequency" voltage is applied to the motor. When the servo is at a null this voltage falls to a low value. The program sensor is designed to sense this low level voltage and close a relay to signal the programmer that the servo action is complete and that the next step may begin. Since in this corrector both latitude and longitude servos are working simultaneously, the program sensors are connected in series so that both servos must be at a null before a signal will pass the programmer.

If a type AN/ASN–7 or similar navigation computer is employed for the computer 26, a decidedly advantageous feature is provided. When either manual or automatic corrections are being inserted in the computer 26, the travel of the vehicle during that time when the controls are being operated is shunted into a storage mechanism and released later when the operation is concluded. The autocorrector can take advantage of this ability when present and perform this shunting and release automatically. When a correction of position is received it is signalled to the autocorrector. At that instant it is necessary to lock the dead reckoning computer at its computed position in order that this device might have sufficient time to note the discrepancy in the two positions. Any change in position after this time would add or subtract from the discrepancy. Putting this change of position into storage until a later time adds to the accuracy of the system.

When the autocorrector is in operation, it is desirable that all manual position corrections be inserted through this device, rather than to bypass it. This is because any manual correction would increase or decrease the discrepancy between computed and corrected position, leading to erroneous computations. When these manual corrections are applied to the computer through this device, they are treated exactly as though they were automatic corrections in all its implications. When this device is in operation, therefore, the manual position controls on the navigation computer are disabled until the device is told (by proper operation of the control) that a manual correction is to be made.

Also, it is not desirable to permit the operator to change the manual wind inputs. As an example, if the operator were to change the wind data just prior to the time at which the device intended to compute a new wind, this device would use this new wind in place of the former in its computation. This would lead to an erroneous wind computation. At any rate, this device computes an average wind based on existing conditions, including compensations for inherent errors in the navigation computer itself. This wind should be "better" under any conditions than any wind information that the operator would have to insert. The device, therefore, is in full control of the wind at all times and the manual wind slewing controls are disabled.

The wind that this device computes is an approximation of the actual wind that exists at a given instant. It is an average of all the winds that have caused drift of the vehicle since the last computation. It is a long time constant smoothing device since it permits gusts and freak winds to affect the computation only in proportion to their magnitude and duration. In addition, it accepts the errors in the computer itself and considers them as a part of the wind. This permits a fairly inaccurate computer to produce comparatively good solutions with a fixed set of parameters, such as heading and speed. Obviously, if any of these parameters are changed this device must correct for the changed conditions, which it will do at the next computation.

There are certain other minor aspects of this device that are not related to the basic functions, but are a direct requirement of the ancillary equipment. In part, they are excitation for the transmitting and computing elements and so forth, that might or might not be required if other similar types were used. In other cases they include switching of computing elements and "flag" indications that could be avoided in other designs. They are important to some particular applications of this device but in most cases could be easily avoided if proper cognizance of the function of this device is taken in the original design of the ancillary equipment.

For example, this device is designed to insert the computed wind directly into the control of the navigation computer. There are no separate elements in this control to accept this transfer of information. It is therefore necessary to utilize the elements existing in the control for a dual function. First these elements must be used to transmit the wind data they contain into this correction device. Secondly, they are used as response elements to receive the newly computed wind. Additionally, of course, they are used as the source of wind data in the navigation computer at which time they are not a part of this correction device.

When these wind data elements are used in this correction device either to give or receive information, they must be disconnected from their circuit responsibilities in the navigation computer. This would not be necessary if separate elements were available exclusively for use with this correction device. When they are temporarily disconnected from the navigation computer, a disruption of normal computation takes place in the navigation computer. To prevent erroneous computations by the computer during this period, certain navigation computer circuits are locked at their previous values. This could be avoided if it were not necessary to interrupt the wind data circuits.

Another similar complication involves the display of present position. The type AN/ASN–7 navigation computer when used for the computer 26 displays either the coordinates of present position or destination on the control unit. Access to the present position section of the computer can only be achieved by causing the control to display present position. Should the operator have the control set to display the destination, this correction device, on occasion, automatically transfers the display to present position. When either is being displayed a "flag" appears showing the appropriate notation. Connections to this flag are internal to the control. Therefore, even though this correction can cause present position to be displayed automatically it cannot cause the proper nomenclature flag to be displayed. To prevent confusion of the operator, another separate flag is caused to drop across and cover the position display during the insertion period. All of this transfer of display and actuation of flags would not be necessary with other navigation computers having simultaneous display of both present position and destination.

The present position of the vehicle is determined at an outside station (in automatic operation). The position as determined is subject to errors that may not be completely eliminated prior to transmission. There is a discrete period required for identification, processing, encoding and transmission of this station derived data to the vehicle. During this period the vehicle has advanced somewhat and this change of position will appear in this device as a discrepancy in the computation. Since the parameters of speed, heading and time are variable, these errors will be reduced in effect if several fixes are allowed to accumulate before a wind computation is made. Time in this case is an effective smoothing function. Partially for this reason, wind computations are made no more often than once each 10 minutes. Fixes received during this ten minute period are immediately inserted into the navigation computer, but the position discrepancies are stored until at least ten minutes have passed. The position fix that is received immediately following an elapse of ten minutes will initiate a wind computation. For the purposes of determining the elapsed time, it is necessary to both stop and start the measurement of time simultaneously. This requires a dual time computer, which in effect, is included in the autocorrector. When a wind computation is initiated, the elapsed time measuring section must be stopped and held during the computation. Since elapsed time is measured from receipt of the pulse (for the next computation), another time measuring section must be started immediately. In the description of the time section this dual nature of the device is demonstrated.

In normal operation (no fix received), the autocorrector receives present position information from the computer preferably as a three wire synchro signal. This information is received by control transformers in the autocorrector. The control transformers drive servo loops which have Cropot outputs whose shaft position is a measure of the present latitude and longitude of the aircraft.

When a fix is received from the ground, it is converted to a voltage by the radio receiver 80.

The Cropots are servoed to the data link output voltage and the difference between present position before and after the fix is stored on the error storage pots. Next, the present position synchros in the computer are servoed to the Cropot shaft position. This completes correction of present position.

Now, depending on the mode of operation, the programmer will either go on to set up the switching required to compute a wind (long cycle), or else will reset the computer to the normal position (short cycle). Assuming a long cycle, the wind computation will now be described.

At the start of a mission, wind velocity and direction are manually set into the computer. This information may be in error due to poor information at the start or changes in wind during the flight. As fixes are received from the ground, the error in the present position indication of the ASN-7 is stored on pots when a fix is received. After more than a fixed minimum length of time has elapsed since the previous computation of wind, ten minutes in this case, an error wind is computed based on the accumulated error and the elapsed time.

Time is computed by a synchronous motor, timer cam and time pot, in such a way that during the period of ten to thirty minutes after the timer is started, the resistance between one end of the pot and the wiper is proportional to the time in excess of ten minutes. When used in a divider circuit, exact division by time is obtained, and when this result is multiplied by the accumulated error, the error wind comes out.

The error wind is computed in terms of its north-south and east-west components. Note the longitude error was converted to east-west miles error by exciting the longitude line with $E \cos Lap$ (present latitude), resulting in $V=K_2 E \cos Lap$.

$$\frac{\text{Error}}{\text{Time}}=\text{Error wind longitude.}$$

The components of error wind are added to the component of the old wind to give the components of the new wind.

Now the new wind passes through a rectangular to polar coordinate converter. Since only one servo amplifier is needed for this conversion, the other one is used, simultaneously, to reset the time pots to their zero positions.

Next, the error storage pots are reset. This causes a shift in the present position lines.

This shift is corrected by returning to the normal mode position. Connection to the computer corrects the present position lines. When this final step has been completed, the programmer permits new fix information to be received.

If no fixes are received in the interval from ten to thirty minutes, a wind is computed on the basis of 10 minutes using whatever position error is stored during the period from zero to ten minutes.

When the equipment is turned on, the programmer sets up the switching for resetting all pots to their zero positions, and sets up the autocorrector in the normal position, ready to receive fixes. The first fix received, called "fix zero," clutches the synchronous motor to the timer cam. After 10 minutes the cam completes one revolution and stops. Now the motor is clutched to the time pots, driving them. If a fix is received during this period, the pots are stopped, and the cam is started again, beginning a new cycle. After the time pots are used to compute the error wind, they are reset. If no fix is received by the time the pots reach the thirty minute end, a switch is triggered telling the programmer to reset the pots and arrange the switching so that the next fix appears as "fix zero."

There is only one difference between a "fix zero" and all other fixes. This occurs in storage of present position error. Since there is no way to tell how much time has elapsed since the last receipt of accurate present position information, it is conceivable that a large present position error would have been built up, even if the wind were only slightly in error. Therefore, "fix zero" is used as a datum fix; that is, it is used to correct present position and to start the time line, but the error information it gives is not stored.

Fix information may be inserted into the autocorrector, manually, provided the autocorrector is in the normal position. The operator pushes the "manual fix" button. This sends a pulse into the system triggering the programmer and timer, as do the normal fixes. The programmer now permits the present position lines in the computer to be slewed externally. As far as the autocorrector is concerned, its input is the same regardless of the source of the fixes. After the present position information has been inserted, the operator pushes the compute button. The programmer now either sets up the wind computation or resets the computer, depending on the position of the time line.

A facility is provided for elimination of the wind computation. When the "short cycle" button is pushed, the programmer sets up the start mode, clearing all wind and error pots. In addition, the time line is disconnected from the fix pulses and short cycle relays are latched. Upon receipt of fixes, present position will be corrected, but the time line and wind section will remain dormant. To reinstate wind computation, the "long cycle" button is pushed, the short cycle relays are released and the time line is reconnected. The next fix received will be a "fix zero."

Several points of particular interest should be noted now.

(1) Time sharing of components has been used extensively, permitting two servo amplifiers to be sufficient for all computations, and to permit a "four pot" solution with only two pots in the wind coordinate converter.

(2) All computations are completely automatic and are controlled by a programmer which senses conditions in the system and sets up switching accordingly.

(3) In order to reduce computational time a null sensing technique was employed. This device senses the completion of a step in the computation and emits a pulse, signalling the programmer to proceed. If, when the following step is reached, a null already exists, a signal is injected into the sensors driving them off null, so that when null is again reached, the completion of a step will have been simulated.

(4) Present position changes are inserted into the computer 26 through a closed loop. This permits more accurate and rapid insertion of large changes than could be achieved with an open loop synchro receiver input.

(5) Because of the nature of the ASN-7, the autocorrector can cause the ASN-7 to store the changes in present position occurring while a computation is being performed. Therefore no error results from the time lost in computing.

While there has been described and pointed out the fundamental novel features of the invention as applied to preferred embodiments, it will be understood that various omissions and substitutions and changes in the form and details of the devices illustrated and in its operation may be made by those skilled in the art without departing from the spirit of the invention. It is the intention, therefore, to be limited only as indicated by the scope of the following claims.

What is claimed is:

1. An autocorrector for dead reckoning equipment which comprises a first means for indicating present vehicle position, a second means coupling the first means to said dead reckoning equipment, a source of correct vehicle information and a third means for automatically decoupling said first means for said dead reckoning equipment and coupling said first means to said source when the latter provides a correct vehicle position wherein said first means has a vehicle position shaft which is displaceable in accordance with vehicle position and there is provided error storage means which includes an error storage potentiometer and a clutch between said vehicle position shaft and said error storage potentiometer, said clutch being actuated during the time interval when said third means is active and said source is providing said first means a correct vehicle position.

2. An autocorrector according to claim 1 wherein said dead reckoning equipment includes a synchro transmitter and there are provided a servo loop comprising a control transformer having an input shaft, said control transmitter being electrically coupled to and controlled by said synchro transmitter, a servo motor electrically controlled by said control transformer and driving said input shaft of said control transformer and said vehicle position shaft, and a servo response potentiometer mechanically driven by said servomotor.

3. An autocorrector according to claim 2 including a servo response potentiometer mechanically driven by said vehicle position shaft and wherein said source is coupled by actuation of said third means between the said servo response potentiometer and said servomotor.

4. An autocorrector according to claim 3 including a servo amplifier coupled between said source and said servomotor.

5. An autocorrector for dead reckoning equipment which comprises a first means for indicating present vehicle position, second means coupling the first means to said dead reckoning equipment, a source of correct vehicle information and a third means for automatically decoupling said first means from said dead reckoning equipment and coupling said first means to said source when the latter provides a correct vehicle position, an error storage means coupled to said first means which is responsive to the change produced in said first means by said third means when the source provides the former with said correct vehicle position, said dead reckoning equipment having an input side for inserting predetermined wind information, and there are provided means dividing the accumulated error in said error storage by the time elapsed during the acculation of such error, and vectorially adding means coupled to said input side of said dead reckoning equipment and said dividing means for providing a corrected wind heading and velocity.

6. An autocorrector according to claim 5 wherein said first means has a vehicle position shaft which is displaceable in accordance with vehicle position, and said error storage means includes an error storage potentiometer and a clutch between said vehicle position shaft and said error storage potentiometer, said clutch being actuated during the time interval when said third means is active and said source is providing a correct vehicle position.

7. An autocorrector for dead reckoning equipment which comprises a first means for indicating present vehicle latitude position, a second means for indicating present vehicle longitude position, a third means for coupling said first means to said dead reckoning equipment, a fourth means for coupling said second means to said dead reckoning equipment, a source of correct vehicle latitude and longitude information, a fifth means for automatically decoupling said first means from said dead reckoning equipment and coupling said first means to said source when the lattter provides a correct vehicle position, and a sixth means for automatically decoupling said second means from said dead reckoning equipment and coupling said second means to said source when the latter provides a correct vehicle position wherein said first means has a first shaft which is displaceable in accordance with vehicle latitude position and said second means has a second shaft which is displaceable in accordance with vehicle longitude position and wherein there is provided a latitude error storage means which includes a latitude error potentiometer and a first clutch between said first shaft and said latitude error potentiometer and a longitude error storage means which includes a longitude error potentiometer and a second clutch between said second shaft and said longitude error potentiometer, said first and second clutches being actuated during the time interval when said fifth and sixth means, respectively, are active and said source is providing a correct vehicle position.

8. An autocorrector according to claim 7 including means responsive to the new displacement of said first and second shaft after the actuation of said fifth and sixth means for correcting said dead reckoning equipment.

9. An autocorrector according to claim 7 wherein said dead reckoning equipment has an input side for inserting thereat predetermined wind information and there are provided a seventh means dividing the accumulated latitude error in said latitude error storage potentiometer by the time elapsed during the accumulation of latitude error and an eighth means dividing the accumulated longitude error in said longitude error storage potentiometer by the time elapsed during the accumulation of longitude error.

10. An autocorrector according to claim 9 including a first resolving means coupled to said input side of said dead reckoning equipment for providing a first output having a north-south component of the inserted wind and a second output for providing an east-west component of the inserted wind, and a vectorial adding means for algebraically adding the outputs of said seventh means and said first output of said first resolving means to produce a north-south subresultant for algebraically adding the outputs of said eighth means and said second output of said first resolver means to produce an east-west subresultant and then for vectorially adding the quadrature subresultants to provide a corrected wind.

11. An autocorrector according to claim 9 wherein said latitude error potentiometer has a center tap and a wiper, said input side has a wind heading means adjustable in accordance with predetermined wind heading information and a wind velocity means adjustable in accordance with predetermined wind velocity information, and there are provided a first resolver having a first and second output, said first resolver being controlled by said wind heading means, a first potentiometer connected across said first output of said first resolver, said first potentiometer being controlled by said wind velocity means and being connected at its output side to said center tap of said latitude error potentiometer, a first series circuit connectable across a first voltage source and including a first time potentiometer and said latitude error potentiometer, a north-south memory wind potentiometer connectable across a second voltage source and having a center tap and a wiper, said wiper of said latitude error potentiometer being connected to said center tap of said north-south memory wind potentiometer, and a first servo loop including a first amplifier and a first motor controlling the mechanical position of said wiper of said north-south memory potentiometer.

12. An autocorrector according to claim 11 wherein said first series circuit includes a first locked-rotor resolver and a second locked-rotor resolver is connected across said north-south memory potentiometer.

13. An autocorrector according to claim 11 wherein said longitude error potentiometer has a center tap and a wiper, and there are provided a second potentiometer connected across said second output of said first resolver, said second potentiometer being controlled by said wind velocity means and being connected at its output side to said center tap of said longitude error poteniometer, a second series circuit connectable across a third voltage source and including a second time potentiometer and said longitude error potentiometer, an east-west memory wind potentiometer connectable across a fourth voltage source and having a center tap and a wiper, said wiper of said longitude error potentiometer being connected to said center tap of said east-west memory wind potentiometer, and a second servo loop including a second amplifier and a second motor controlling the mechanical position of said wiper of said east-west memory potentiometer.

14. An autocorrector according to claim 13 wherein said first series circuit includes a first locked-rotor resolver and said second series circuit includes a third resolver, and there is provided a second locked-rotor resolver having first and second windings, said first winding being connected across said north-south memory potentiometer, and said east-west memory wind potentiometer being connected across said second winding of said second locked-rotor resolver.

15. An autocorrector according to claim 14 including a timing means for varying the current in said first and second series circuits inversely with respect to time after a predetermined time period elapses.

16. An autocorrector according to claim 15 wherein said timing means includes a timing motor, and means mechanically coupling said timing motor to said first and second time potentiometers after the lapse of said predetermined time period, said last mentioned means being controlled by said source when the latter provides a correct vehicle position.

17. An autocorrector according to claim 16 wherein said first output of said first resolver is connected across said second memory potentiometer, said centertap of said second memory potentiometer is grounded, said centertap of said first memory potentiometer is connected to said second memory potentiometer at its output side, and said second output of said first resolver is connected across said first memory potentiometer, and wherein there is provided a wind heading servo loop mechanically coupled between said first memory potentiometer and said first resolver, whereby the dormant mechanical position of said first resolver represents the true wind heading.

18. An autocorrector according to claim 16 wherein said first output of said first resolver is connected across said first memory potentiometer, said centertap of said first memory potentiometer is connected to said second memory potentiometer at its output side, said second output of said first resolver is connected across said second memory potentiometer, said centertap of said second memory potentiometer is grounded, and there is provided a wind velocity potentiometer connected across said fourth locked-rotor resolver and connected at its output side to said first memory potentiometer at its output side, and a wind velocity servo loop mechanically coupled to said wind velocity potentiometer for displaying true wind velocity.

19. An autocorrector according to claim 7 wherein said dead reckoning equipment includes a coarse line latitude synchrotransmitter and a fine line latitude synchrotransmitter, and said third means includes a coarse line latitude control transformer coupled to said coarse line latitude synchrotransmitter, a fine line latitude control transformer coupled to said fine line latitude synchrotransmitter, a latitude two-speed switch connected at its input side to said latitude control transmitters, and a latitude servo motor electrically coupled to said two-speed switch and mechanically driving said first shaft and said latitude control transformers.

20. An autocorrector according to claim 19 including a coarse latitude servo response potentiometer mechanically driven by said first shaft and a fine latitude servo response potentiometer mechanically driven by said first shaft and wherein said source has a coarse and fine latitude output and said fifth means when activated disconnects said latitude two-speed switch at its input side from said latitude control transformers and connects a cropot two-speed switch at its input side to said coarse and fine servo response potentiometers through said coarse and fine latitude outputs, respectively, of said source.

21. An autocorrector according to claim 20 including a latitude amplifier coupled between said latitude two-speed switch at its output side, and said latitude servo motor.

22. An autocorrector according to claim 21 wherein said dead reckoning equipment includes a fine line longitude synchrotransmitter and said fourth means including a fine line longitude control transformer, a longitude servomotor electrically coupled to said longitude control transformer and mechanically driving said second shaft and said longitude control transformer.

23. An autocorrector according to claim 22 including a longitude two-speed switch, a coarse longitude servo response potentiometer mechanically driven by said second shaft and a fine longitude servo response potentiometer mechanically driven by said second shaft and wherein said source has a coarse and fine longitude output and said sixth means when activated decouples said longitude servomotor from said longitude control transformer and couples said longitude servomotor to said longitude two-speed switch at its output side, said longitude two-speed switch being connected at its input side to said coarse and fine servo response potentiometers through said coarse and fine longitude output, respectively, of said source.

24. An autocorrector according to claim 24 including a longitude amplifier coupled between said longitude two-speed switch at its output side, and said longitude servomotor.

References Cited by the Examiner

UNITED STATES PATENTS

| | | | |
|---|---|---|---|
| 2,652,979 | 9/53 | Chance | 235—151 |
| 2,943,321 | 6/60 | Karpeles | 235—187 |
| 3,070,796 | 12/62 | Gray | 235—187 X |

MALCOLM A. MORRISON, *Primary Examiner.*

WALTER W. BURNS, Jr., *Examiner.*